(12) United States Patent
Sasaki et al.

(10) Patent No.: US 8,065,787 B2
(45) Date of Patent: Nov. 29, 2011

(54) METHOD OF MANUFACTURING A THERMALLY ASSISTED MAGNETIC HEAD

(75) Inventors: Yoshitaka Sasaki, Milpitas, CA (US); Hiroyuki Ito, Milpitas, CA (US); Atsushi Iijima, Shatin (CN)

(73) Assignees: Headway Technologies, Milpitas, CA (US); TDK Corporation, Tokyo (JP)

( * ) Notice: Subject to any disclaimer, the term of this patent is extended or adjusted under 35 U.S.C. 154(b) by 0 days.

(21) Appl. No.: 12/659,691

(22) Filed: Mar. 17, 2010

(65) Prior Publication Data
US 2011/0228416 A1 Sep. 22, 2011

(51) Int. Cl.
*G11B 5/127* (2006.01)
*H04R 31/00* (2006.01)
(52) U.S. Cl. .............. 29/603.12; 29/603.13; 29/603.14; 29/603.15; 29/603.18; 205/199; 205/122; 360/121; 360/122; 360/317; 360/319; 360/321
(58) Field of Classification Search ............... 29/603.07, 29/603.13–603.16, 603.18; 205/119, 122; 360/121, 122, 317, 319–321
See application file for complete search history.

(56) References Cited

U.S. PATENT DOCUMENTS 7,538,978 B2 * 5/2009 Sato et al. ............... 360/128
7,855,937 B2 * 12/2010 Shimazawa et al. ....... 369/13.33

FOREIGN PATENT DOCUMENTS

| JP | A-2007-164935 | 6/2007 |
| JP | A-2007-207349 | 8/2007 |
| JP | A-2008-47268 | 2/2008 |
| JP | A-2009-266365 | 11/2009 |

* cited by examiner

*Primary Examiner* — Paul D Kim
(74) *Attorney, Agent, or Firm* — Oliff & Berridge, PLC

(57) ABSTRACT

A thermally assisted magnetic head is formed by performing a head forming process, a mounting part forming process and a light source mounting process in that order. In the head forming process, a planned area is secured on a light source placing surface of a slider substrate, then a magnetic head part is formed on a head area other than the planned area and a spacer for securing a mounting space for the laser diode is formed on the planned area. In the mounting part forming process, a light source mounting part is formed by removing the spacer. In the light source mounting process, a laser diode is mounted on the light source mounting part formed by the mounting part forming step.

10 Claims, 28 Drawing Sheets

Fig.6
(A)
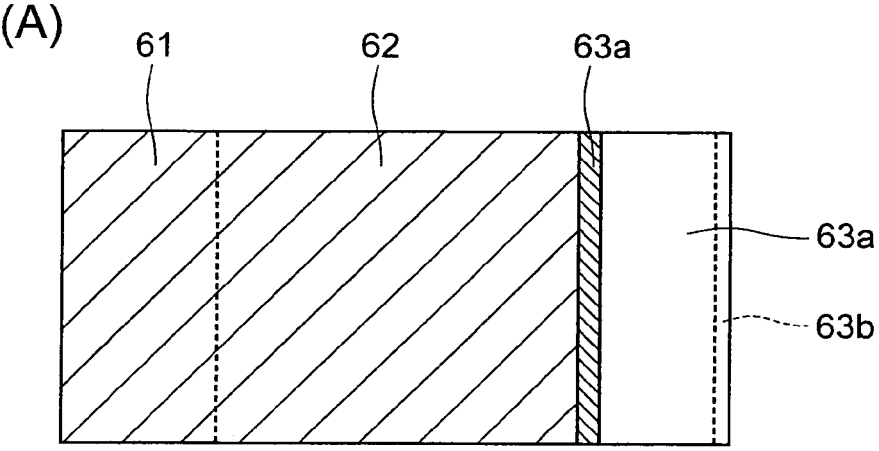
(B)
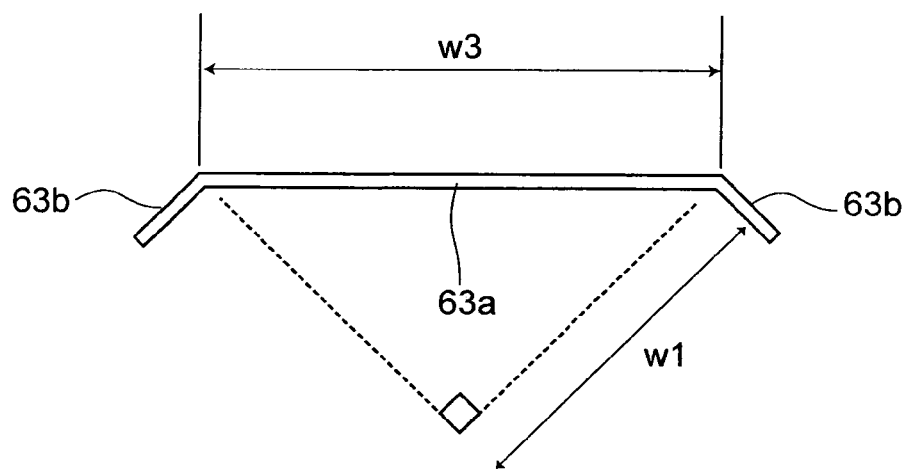

METHOD OF MANUFACTURING A THERMALLY ASSISTED MAGNETIC HEAD

BACKGROUND

1. Field of the Invention

The present invention relates to a method of manufacturing a thermally assisted magnetic head recording data on a magnetic recording medium by thermally assisted magnetic recording using near-field light and the thermally assisted magnetic head, and a head gimbal assembly and a hard disk drive each having a thermally assisted magnetic head.

2. Related Background Art

In recent years, as magnetic disk drives have been increasing their recording densities, thin-film magnetic heads recording data on a magnetic recording media have been required to further improve their performances. As the thin-film magnetic heads, those of composite type having a structure in which a reproducing head having a magnetoresistive device (hereinafter, referred to also as an "MR device") for read and a recording head having an electromagnetic coil device for write are laminated have been conventionally in wide use. In a magnetic disk drive, the thin-film magnetic head is provided on a slider which very slightly floats from the magnetic recording medium.

Incidentally, the magnetic disk drive records data by magnetizing magnetic fine particles on the magnetic recording medium using the recording head. In order to increase the recording density of the magnetic recording medium, it is effective to make the magnetic fine particles smaller.

When the magnetic fine particles are made smaller, however, there arises a problem that the magnetization thereof becomes unstable with respect to heat as the particles reduce in volume, thereby increasing the possibility that the data recorded on the magnetic recording medium is lost. To solve the problem, it is effective to increase the magnetic energy of the magnetic fine particles to thereby enhance the stability of magnetization. When the magnetic energy of the magnetic fine particles is increased, however, there arises another problem that the coercive force (difficulty in reversing magnetization) of the magnetic recording medium increases to deteriorate the data recording performance.

To solve such problems, a method called thermally assisted magnetic recording has been conventionally proposed. When recording data on a magnetic recording medium having a large coercive force, the thin-film magnetic head employing the thermally assisted magnetic recording (hereinafter, referred to as a "thermally assisted magnetic head") records data while instantaneously, heating and thereby increasing the temperature of a portion of the magnetic recording medium where data will be recorded.

Since the magnetic fine particles decrease in coercive force when the temperature is increased, instantaneous heating makes it possible to record data even on the magnetic recording medium having a high coercive force at room temperature. The portion of the magnetic recording medium where the data has been recorded is decreased in temperature after the recording of data and thereby increases in coercive force. Therefore, by using the thermally assisted magnetic head, it becomes possible to make the magnetic fine particles finer as well as stabilize recording in the magnetic disk drive.

On the other hand, near-field light is used as means for heating the magnetic recording medium in the conventional thermally assisted magnetic head. When light enters an opening smaller than the wavelength of light, the light slightly seeps from the opening and locally exists near the opening. The light locally existing near the opening is called near-field light. The near-field light is confined in a region much smaller than that of a spot light obtained by collecting light using a lens, so that use of the near-field light makes it possible to heat only a limited extremely small recording region of the magnetic recording medium.

In the conventional thermally assisted magnetic head, a near-field light generating part is provided for generating the near-field light. In this method, the near-field light is generated by guiding laser light to the near-field light generating part via an optical waveguide. This near-field light is used as means for heating the magnetic recording medium.

On the other hand, a semiconductor laser such as laser diode or the like is used as a light source for generating a laser light guided to the near-field light generating part in the prior art. For example, a hard disk drive which the semiconductor laser is provided on the outside of the Head Gimbal Assembly having the thermally assisted magnetic head is disclosed in Japanese Patent Application Laid-Open No. 2007-164935, Japanese Patent Application Laid-Open No. 2007-207349. This hard disk drive is structured to connect the semiconductor laser to the thermally assisted magnetic head by an optical fiber and to guide the laser light generated by the semiconductor laser to the near-field light generating part of the thermally assisted magnetic head via the optical fiber.

A structure which the laser diode is provided on an opposite side (rear side) of a medium-opposing surface of the slider is disclosed in Japanese Patent Application Laid-Open No. 2008-47268, Japanese Patent Application Laid-Open No. 2009-266365. In this structure, an incident part of the optical waveguide is formed on the rear side of the slider, and an emitting part of the laser diode is opposed to the incident part of the optical waveguide. The laser diode is fixed on a light source supporting substrate provided on the rear side of the slider.

SUMMARY OF THE INVENTION

As described above, in the conventional thermally assisted magnetic head, the laser light are guided to the near-field light generating part to generate the near-field light.

However, when the laser diode is arranged at a position distant from the thermally assisted magnetic head as in the prior arts described in Japanese Patent Application Laid-open No. 2007-164935 and Japanese Patent Application Laid-open No. 2007-207349, a loss or the like occurs during the process of the laser light propagating through the optical fiber. Thus, as the distance from the laser diode to the near-field light generating part increases, the output of the guided laser light decreases, and the apparatus has a more complicated structure and grows in size due to provision of an optical fiber and so on, which are unsolved problems.

On the other hand, when the structures in the prior arts described in Japanese Patent Application Laid-open No. 2008-47268 and Japanese Patent Application Laid-open No. 2009-266365 are employed, the distance from the laser diode to the near-field light generating part is able to be reduced.

In these structures, however, the laser diode and the light source supporting substrate greatly bulge out to the rear face side of the slider, causing a problem that the dimension of the whole thermally assisted magnetic head in the depth direction seen from the medium-opposing surface becomes large.

Further, if the emitting part from which the laser light from the laser diode is emitted and the incident part of the optical waveguide on which the laser light in incident are misaligned with each other, the output of the laser light reaching the near-field light generating part decreases. Accordingly, it is important that the position of the emitting part and the position of the incident part precisely coincide with each other in the thermally assisted magnetic head.

However, since the laser diode is fixed to a member that is physically different from the slider, that is, the light source supporting substrate in the conventional thermally assisted magnetic head, it has been difficult to increase the accuracy of alignment of making the position of the emitting part precisely coincide with the position of the incident part.

The present invention is made to solve the above problems, and it is an object to provide a method of manufacturing a thermally assisted magnetic head having a structure in which the dimension in the depth direction seen from the medium-opposing surface can be reduced and precise alignment of the emitting part of the laser diode with the incident part of the optical waveguide at a high accuracy can be easily performed, and the thermally assisted magnetic head, and a head gimbal assembly and a hard disk drive each having the thermally assisted magnetic head.

To solve the above problems, the present invention provides a method of manufacturing a thermally assisted magnetic head comprising a slider having a medium-opposing surface opposing a magnetic recording medium; and a laser diode emitting a laser light, including the following steps (1) to (3):

(1) a head forming step of securing a planned area, according to a placing part of the laser diode to be placed on a light source placing surface of a slider substrate constituting the slider intersecting with the medium-opposing surface, which the laser diode will be mounted afterward on the light source placing surface, then forming a magnetic head part, in a head area other than the planned area on the light source placing surface, including a recording head used for recording data on the magnetic recording medium and an optical waveguide guiding the laser light emitted from the laser diode to the medium-opposing surface side, and forming or arranging a spacer for securing a mounting space for the laser diode, in the planned area;

(2) a mounting part forming step of removing the spacer to form, in the planned area, a light source mounting part comprising a bottom part according to the placing part and a wall part formed along an edge portion of the bottom part and having an incident part of the optical waveguide on which the laser light is incident, formed at a corresponding position corresponding to an emitting part of the laser diode from which the laser light is emitted; and (3) a light source mounting step of mounting the laser diode on the light source mounting part formed by the mounting part forming step.

According to this manufacturing method, the mounting space for the laser diode is able to be secured surely on the light source placing surface of the slider substrate. Further, by removing the spacer, the light source mounting part that is the mounting space for the laser diode appears, and the laser diode is able to be mounted on the light source mounting part. Mounting the laser diode on the light source mounting part makes it possible to align the emitting part with the incident part.

In the above-described method of manufacturing a thermally assisted magnetic head, it is preferable that in the head forming step, a spacer magnetic layer is formed as the spacer using a magnetic material for a head used when the magnetic head part is formed.

Further, in the above-described method of manufacturing a thermally assisted magnetic head, it is preferable that in the head forming step, a spacer magnetic layer is formed as the spacer using magnetic materials for a head used when a plurality of head magnetic layers constituting the magnetic head part are formed respectively, and the spacer magnetic layer is composed of a plurality of laminated corresponding magnetic layers being flush with the respective head magnetic layers.

Further, it is preferable that the head forming step includes the following step (4), (5):

(4) a surface aligning part forming step of forming a surface aligning part that is flush with the spacer magnetic layer, on an uppermost surface of a laminated body that has been already laminated in the head area; and (5) an optical waveguide forming step of forming the optical waveguide on the surface aligning part.

In the above-described method of manufacturing a thermally assisted magnetic head, it is preferable that where a distance from the placing part of the laser diode to the emitting part emitting the laser light is an emitting height, and when a thickness of the spacer magnetic layer falls within an emitting height range indicating a range of the emitting height, the surface aligning part forming step is executed.

Further, in the above-described method of manufacturing a thermally assisted magnetic head, it is preferable that when the thickness of the spacer magnetic layer falls within a range lower than an intermediate value of the emitting height range, the surface aligning part forming step is executed.

Further, in the above-described method of manufacturing a thermally assisted magnetic head, it is preferable that in the optical waveguide forming step, the optical waveguide is formed to be connected to the wall part.

In the above-described method of manufacturing a thermally assisted magnetic head, it is preferable that the head forming step includes the following step (6), (7), (8):

(6) a near-field light generating layer forming step of forming a near-field light generating layer generating near-field light for heating the magnetic recording medium using the laser light;

(7) a coil forming step of forming a thin film coil constituting the recording head; and (8) a main magnetic pole layer forming step of forming a main magnetic pole layer constituting the recording head.

In the above-described method of manufacturing a thermally assisted magnetic head, it is preferable that when the emitting part emitting the laser light intersects with the medium-opposing surface when the laser diode is mounted on the light source mounting part in the light source mounting step, a mirror part changing a direction of the laser light from a direction along the medium-opposing surface to a direction intersecting with the medium-opposing surface is formed in the optical waveguide forming step.

Further, in the above-described method of manufacturing a thermally assisted magnetic head, it is preferable that the optical waveguide is formed such that a thickness of a portion of the optical waveguide on a light source side closer to the planned area is larger than a thickness of a portion of the optical waveguide on an opposing surface side closer to the medium-opposing surface.

Further, the present invention provides a thermally assisted magnetic head, including a slider having a medium-opposing surface opposing a magnetic recording medium; and a laser diode emitting a laser light, wherein the slider includes a slider substrate; a magnetic head part including a recording head used for recording data on the magnetic recording medium and an optical waveguide guiding the laser light emitted from the laser diode to the medium-opposing surface side; and a light source mounting part formed on a light source placing surface of the slider substrate intersecting with the medium-opposing surface; wherein the light source mounting part comprises a bottom part according to a placing part of the laser diode to be placed on the light source placing surface, and a wall part formed along an edge portion of the bottom part, wherein the wall part has an incident part of the optical waveguide on which the laser light is incident formed at a corresponding position corresponding to an emitting part of the laser diode from which the laser light is emitted, and wherein the laser diode is mounted on the light source mounting part such that the emitting part and the incident part are opposed to each other.

Since the laser diode is mounted on the light source placing surface in this thermally assisted magnetic head, the laser diode bulges out in the direction along the medium-opposing surface. Further, since the incident part is formed at the corresponding position of the wall part corresponding to the emitting part, the laser diode is mounted on the light source mounting part with the incident part being precisely aligned with the emitting part.

In the thermally assisted magnetic head, it is preferable that the wall part is formed by laminating end faces of a plurality of head constituting layers constituting the magnetic head part including the optical waveguide.

Further, in the thermally assisted magnetic head, it is preferable that the optical waveguide includes a first optical waveguide having the incident part and extending from the wall part in a direction along the medium-opposing surface, a second optical waveguide connected to the first optical waveguide and extending in a direction intersecting with the medium-opposing surface, and a mirror part changing a travel direction of the laser light from the direction along the medium-opposing surface to the direction intersecting with the medium-opposing surface.

It is preferable that a set angle of the mirror part seen from the incident part is set at 45 degrees.

Further, it is preferable that a projecting width of the mirror part seen from the incident part is set to be equal to or larger than a lateral width of the incident part in the direction intersecting with the medium-opposing surface.

Further, it is preferable that an outer length of the first optical waveguide on a side distant from the medium-opposing surface is set to be equal to or larger than an inner length of the first optical waveguide on a side of the medium-opposing surface.

Further, it is preferable that the first optical waveguide is formed larger in thickness than the second optical waveguide.

Further, the present invention provides a head gimbal assembly including a thermally assisted magnetic head having a slider and a laser diode emitting a laser light, wherein the slider includes a slider substrate; a magnetic head part including a recording head used for recording data on the magnetic recording medium and an optical waveguide guiding the laser light emitted from the laser diode to the medium-opposing surface side; and a light source mounting part formed on a light source placing surface of the slider substrate intersecting with the medium-opposing surface; wherein the light source mounting part comprises a bottom part according to a placing part of the laser diode to be placed on the light source placing surface, and a wall part formed along an edge portion of the bottom part, wherein the wall part has an incident part of the optical waveguide on which the laser light is incident formed at a corresponding position corresponding to an emitting part of the laser diode from which the laser light is emitted, and wherein the laser diode is mounted on the light source mounting part such that the emitting part and the incident part are opposed to each other.

Further, the present invention provides a hard disk drive including a head gimbal assembly having a thermally assisted magnetic head including a slider and a laser diode emitting a laser light; and a magnetic recording medium opposing the thermally assisted magnetic head, wherein the slider includes a slider substrate; a magnetic head part including a recording head used for recording data on the magnetic recording medium and an optical waveguide guiding the laser light emitted from the laser diode to the medium-opposing surface side; and a light source mounting part formed on a light source placing surface of the slider substrate intersecting with the medium-opposing surface; wherein the light source mounting part comprises a bottom part according to a placing part of the laser diode to be placed on the light source placing surface, and a wall part formed along an edge portion of the bottom part, wherein the wall part has an incident part of the optical waveguide on which the laser light is incident formed at a corresponding position corresponding to an emitting part of the laser diode from which the laser light is emitted, and wherein the laser diode is mounted on the light source mounting part such that the emitting part and the incident part are opposed to each other.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 6 (A) is a sectional view taken along the line 6-6 in FIG. 5, FIG. 6 (B) is a plan view of a mirror part formed in the optical wave guide;

DESCRIPTION OF THE PREFERRED EMBODIMENTS

In the following, embodiments of the present invention will be described with reference to the drawings. Note that the same components will be referred to with the same numerals or letters, while omitting their overlapping descriptions.

Structures of Thermally Assisted Magnetic Head

Figure 1:
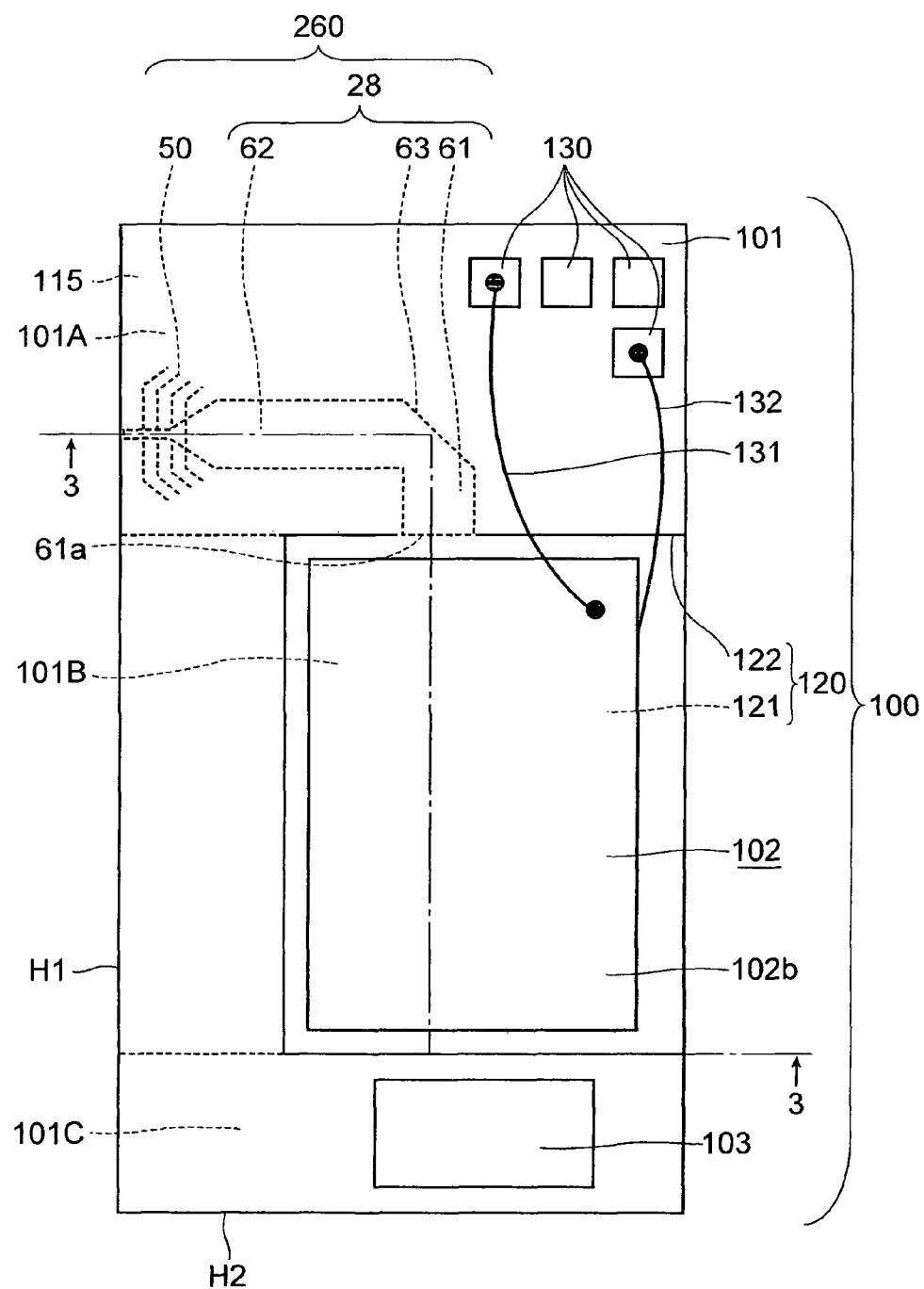
FIG. 1 is a plan view of the thermally assisted magnetic head in accordance with an embodiment of the present invention, seen from a side of a light source placing surface.
Figure 2:
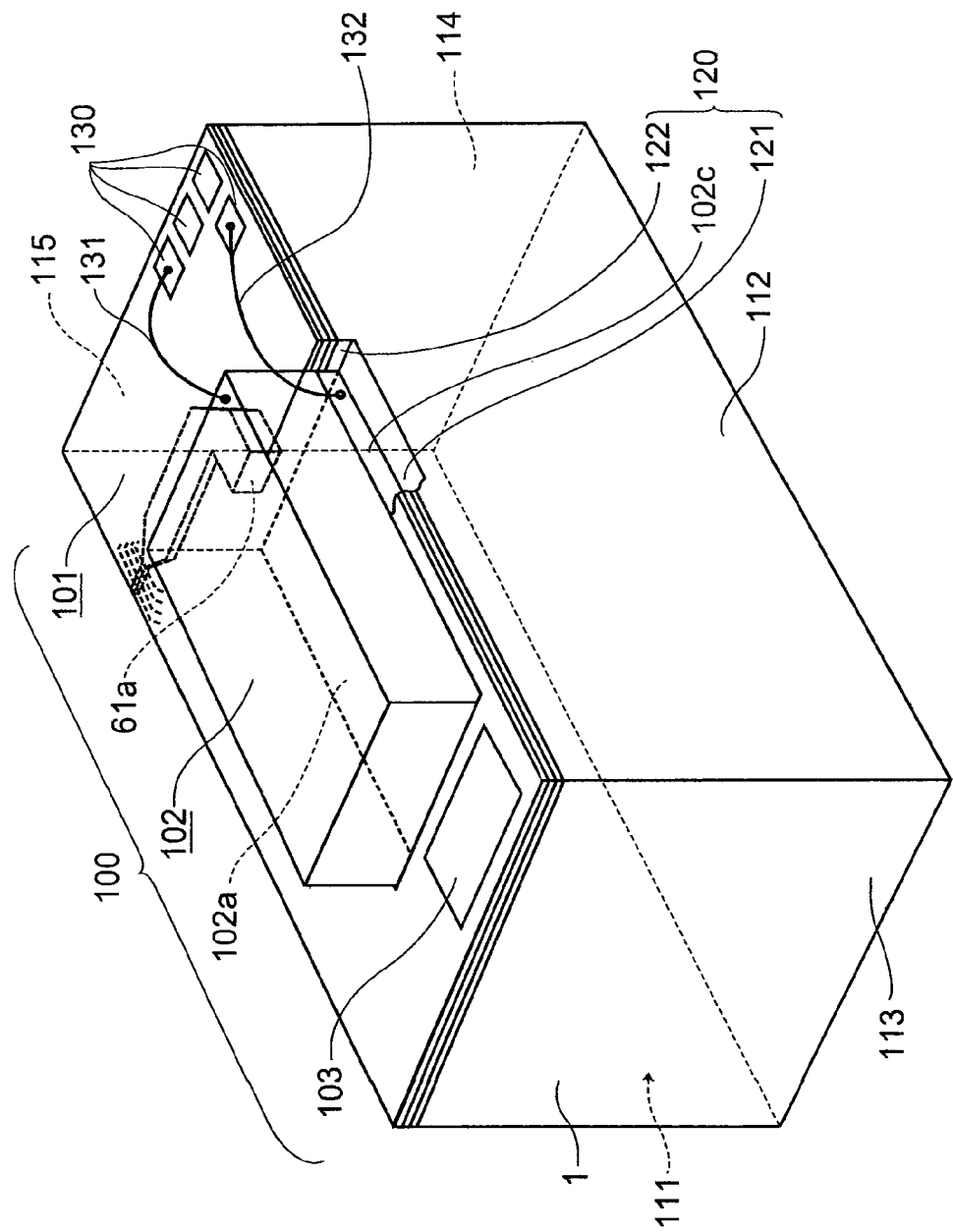
FIG. 2 is a perspective view of the thermally assisted magnetic head seen from an opposite side of its ABS.
Figure 3:
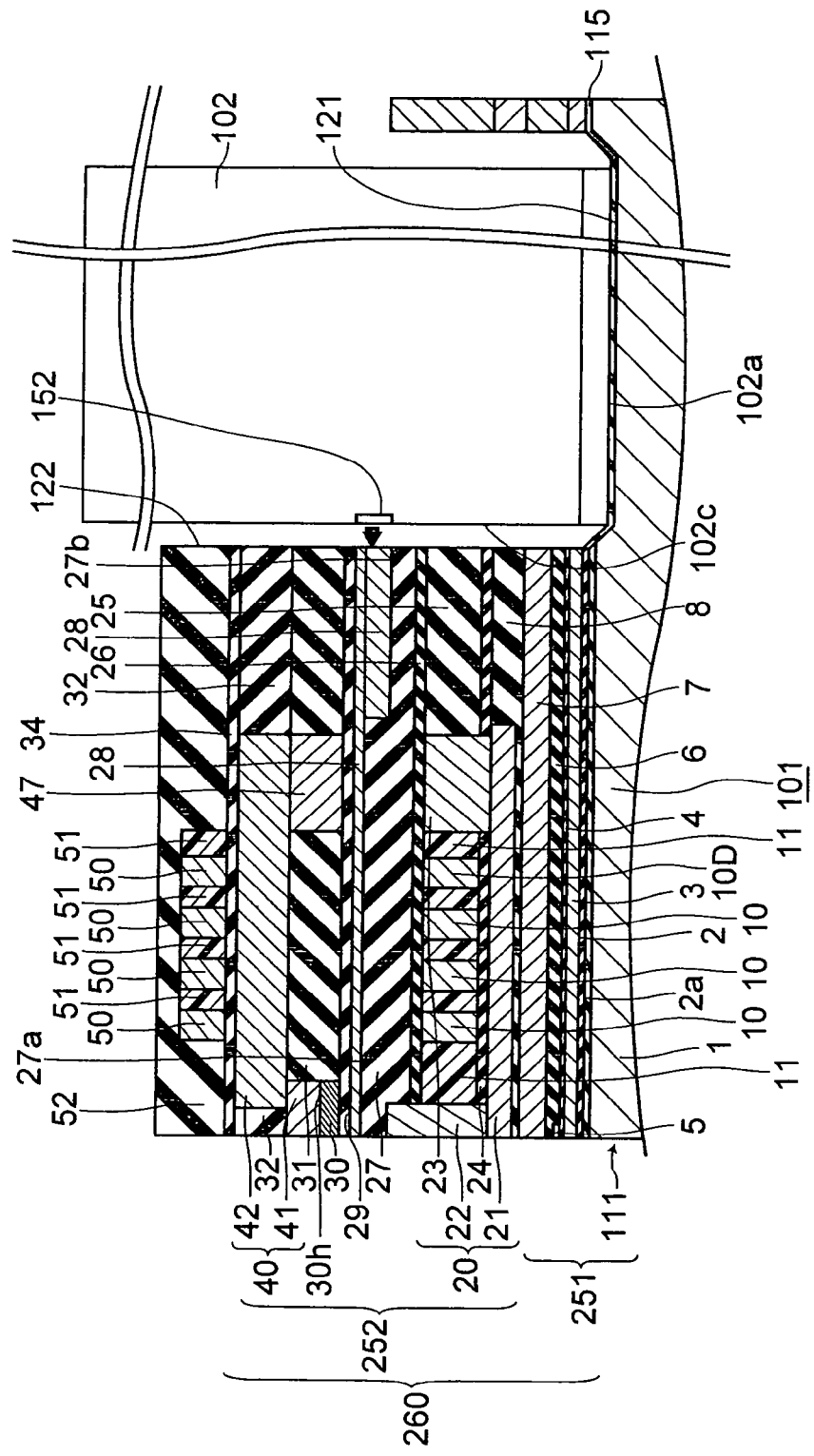
FIG. 3 is a sectional view taken along the line 3-3 in FIG. 1.
Figure 4:
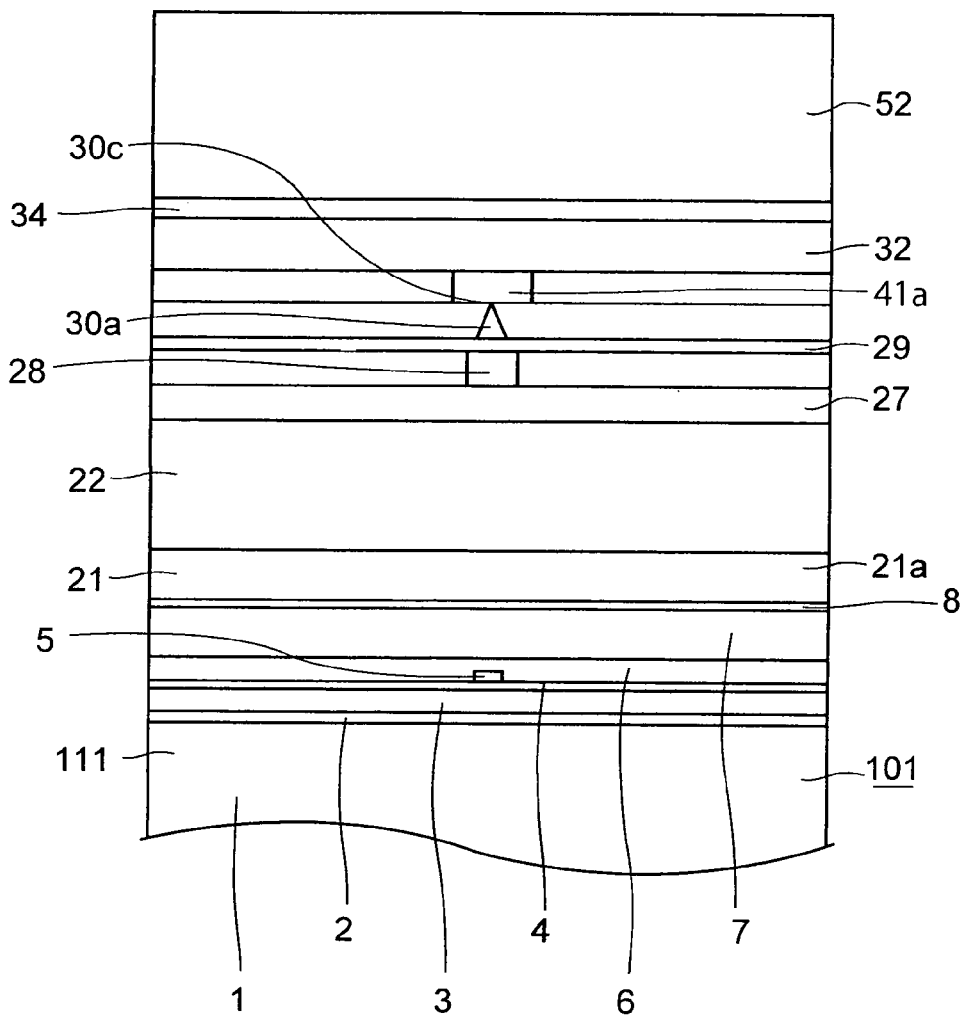
FIG. 4 is a front view of the magnetic head part in the thermally assisted magnetic head, seen from the ABS.
Figure 5:
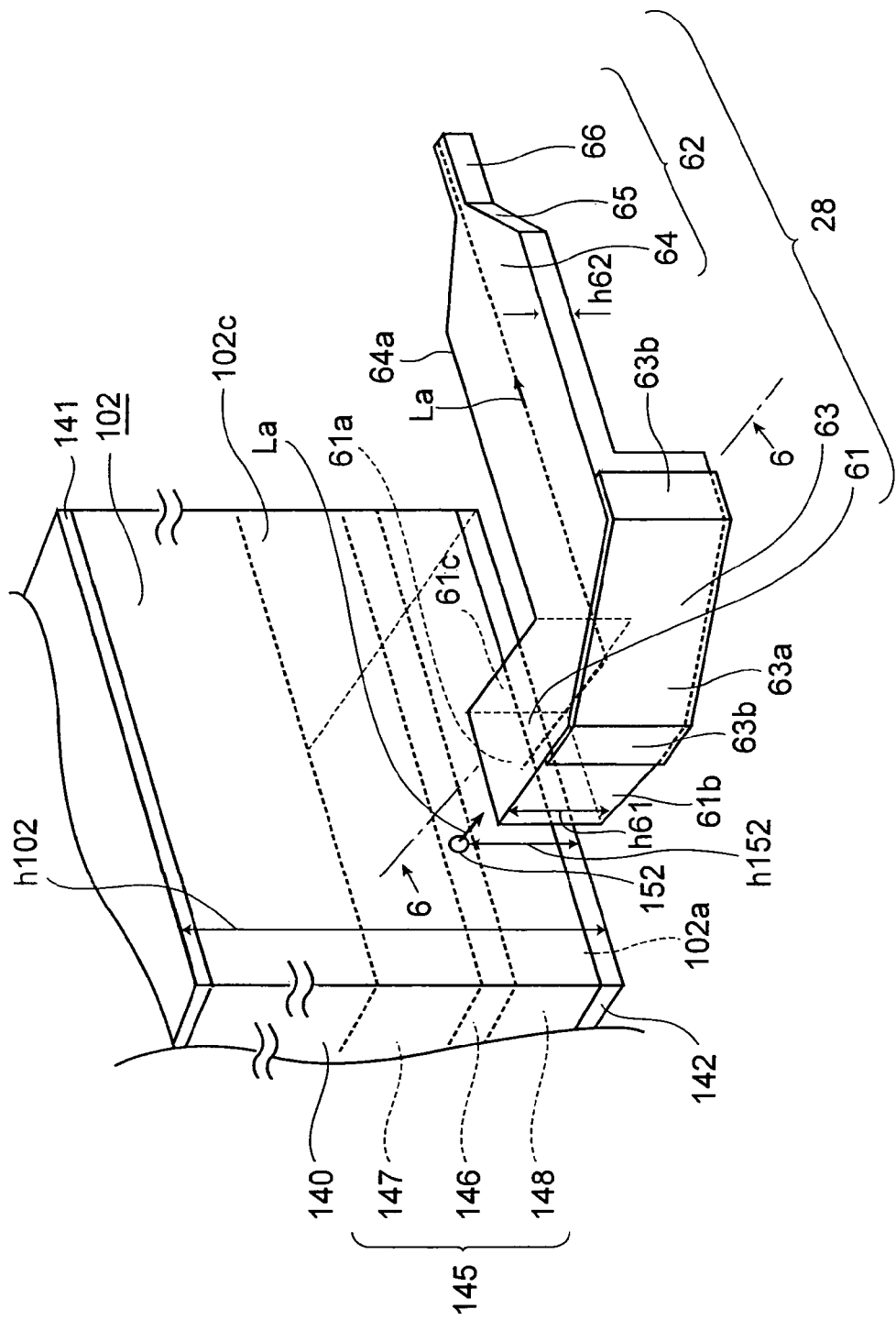
FIG. 5 is a perspective view schematically illustrating an optical wave guide included in the magnetic head part, and a laser diode.

To begin with, the structure of a thermally assisted magnetic head will be described with reference to FIG. 1 to FIG. 5. Here, FIG. 1 is a plan view of the thermally assisted magnetic head 100 in accordance with an embodiment of the present invention, seen from a side of a light source placing surface, while FIG. 2 is a perspective view of the thermally assisted magnetic head, seen from an opposite side of an air bearing surface (which will hereinafter be referred also to as "ABS"). Besides, FIG. 3 is a sectional view taken along the line 3-3 in FIG. 1, and FIG. 4 is a front view of a magnetic head part in the thermally assisted magnetic head 100 seen from the ABS 111. FIG. 5 is a perspective view schematically illustrating an optical wave guide 28 included in the magnetic head part 260, and a laser diode 102.

Thermally assisted magnetic head 100 comprises a slider 101, a laser diode 102 as a light source output a laser light and photodiode 103.

The slider 101 is formed in a rectangular parallelepiped shape. The slider 101 comprises a slider substrate 1, as a main component, made of a ceramic material such as aluminum oxide-titanium carbide ($Al_2O_3 \cdot TiC$) or the like.

The slider 101 has the ABS 111 as a medium-opposing surface opposing a magnetic recording medium, a rear face 112 opposite the ABS 111, and two side faces 113 and 114 facing each other. In addition, as shown in FIG. 2, a surface of the surfaces of a slider substrate 1 orthogonally intersecting with the ABS 111 is a light source placing surface 115.

On the light source placing surface 115, a later-described light source mounting part 120 is formed. Further, on the light source placing surface 115, as shown in FIG. 3, the magnetic head part 260 which be described later is formed using a thin film forming process. Furthermore, the light source placing surface 115 has, as shown in FIG. 1, a long side H1 in a direction along the ABS 111 and a short side H2 intersecting with the long side H1. The long side H1 is able to be, for example, 700 μm, and the short side H2 is able to be, for example, 230 μm.

The slider 101 has three areas such as a head area 101A, a planned area 101B, a PD area 101C which are secured on the light source placing surface 115. The head area 101A is an area in which the magnetic head part 260 is formed, and is secured in an area other than the planned area 101B. Further, in the head area 101A, a plurality of electrode pads 130 are formed. To each of the electrode pads 130, a bonding wire 131 or a bonding wire 132 is connected. The bonding wire 131 is connected to the electrode pad 130 and to one electrode (an n-electrode which will be described later) of the laser diode 102, and the bonding wire 132 is connected to one of the other electrode pads 130 and to the other electrode (a p-electrode which will be described later) of the laser diode 102.

The planned area 101B is an area that has been secured, as an area in which the laser diode 102 will be mounted afterward, on the light source placing surface 115 of the slider substrate 1 before the thermally assisted magnetic head 100 is completed. The laser diode 102 is mounted on the light source mounting part 120 formed in the planned area 101B to constitute the thermally assisted magnetic head 100. FIG. 1 shows the thermally assisted magnetic head 100, and therefore the laser diode 102 has already been mounted in the planned area 101B in FIG. 1.

In the planned area 101B, the light source mounting part 120 is formed. The light source mounting part 120 has, as shown in FIG. 2, a bottom part 121 and a wall part 122. A portion in a recessed shape formed by the bottom part 121 and the wall part 122 is the light source mounting part 120. The bottom part 121 is formed on the light source placing surface 115. The bottom part 121 is formed in a flat rectangular shape. The shape of the bottom part 121 is a shape according to the outside dimension of a later-described placing part 102a of the laser diode 102. For example, the bottom part 121 can be formed in a rectangular shape having a size that is the same as or very slightly larger than the outside dimension of the placing part 102a. Further, as shown in FIG. 3, the bottom part 121 is formed at a position slightly recessed from the other portion of the light source placing surface 115.

The wall part 122 is formed to surround the bottom part 121 from every direction along the peripheral portion of the bottom part 121. The wall part 122 stands in a direction substantially orthogonal to the bottom part 121. As shown in FIG. 3, the wall part 122 has an end face laminated structure in which end faces of a plurality of head constituting layers (for example, an optical waveguide 28, an insulating layer 25, and so on which will be described later), that are components of the magnetic head part 260, are laminated.

In addition, as shown in FIG. 1 and FIG. 2, a later-described incident part 61a of the optical waveguide 28 is included in the wall part 122, as one of the end faces of the head constituting layers, and the incident part 61a appears at the wall part 122. The incident part 61a is arranged at a position closest to the head area 101A in the wall part 122. Further, the incident part 61a is arranged at a position (a corresponding position) according to a later-described emitting part 152 of the laser diode 102. The incident part 61a has a width according to the thickness of the optical waveguide 28 between a portion thereof having the largest height from the light source placing surface 115 and a portion thereof having the smallest height, and thus has a thickness h61 according to the thickness of the optical waveguide 28 (see FIG. 26 and described later for details). The incident part 61a is formed at the position corresponding to the emitting part 152, so that as well as the emitting part 152 is arranged in the thickness h61 of the incident part 61*a*, the emitting part. 152 is also arranged in a later-described lateral width w2 of the incident part 61*a*, in the state where the laser diode 102 is mounted.

In the PD area 101C, the photodiode 103 is formed. The photodiode 103 is means for monitoring a change of laser light La generated by the laser diode 102 over time, and is structured such that the laser light leaking from the optical waveguide 28 is inputted thereto. Using the laser diode 102 for a long time may decrease output of the laser light La. This may change the intensity and the size of the spot of near-field light generated from a near-field light generating layer 30 which will be described later. Therefore, the change of the laser light La over time is monitored by the laser diode 103, and the current flowing through the laser diode 102 is controlled according to the change so that the output of the laser light La is made constant.

Next, the laser diode 102 has, as shown in FIG. 1 and FIG. 2, the placing part 102*a* to be placed on the light source placing surface 115, a top end face 102*b* opposite the placing part 102*a*, and a peripheral end part 102*c* along the outer periphery of the placing part 102*a*.

The placing part 102*a* and the peripheral end part 102*c* are embedded in the light source mounting part 120. Further, as shown in FIG. 3, the placing part 102*a* is fixed at the bottom part 121, and the peripheral end part 102*c* is opposed to the wall part 122 with a certain gap intervening between them. The placing part 102*a* and the peripheral end part 102*c* are embedded in the light source mounting part 120 and the placing part 102*a* is secured to the bottom part 121, whereby the laser diode 102 is mounted on the light source mounting part 120. Further, as shown in FIG. 5, the emitting part 152 and the incident part 61*a* are opposed to each other so that the laser light La is applied to the incident part 61*a* from the direction orthogonal to the incident part 61*a*.

The laser diode 102 will be described in detail referring to FIG. 5 as follows. The laser diode 102 has an n-substrate 140, an n-electrode 141, a light emitting layer 145, and a p-electrode 142, and has a rectangle parallelepiped shape. In addition, the n-electrode 141 is junctioned on a surface on the outside of the n-substrate 140. Further, the light emitting layer 145 is formed on a side of the n-substrate 140 opposite to the n-electrode 141, and the p-electrode 142 is junctioned on the light emitting layer 145. The light emitting layer 145 has an active layer 146, an n-clad layer 147, and a p-clad layer 148, and has a structure in which the active layer 146 is sandwiched between the n-clad layer 147 and the p-clad layer 148. In addition, the emitting part 152 is formed in the active layer 146.

In the laser diode 102, the surface of the p-electrode 142 constitutes the placing part 102*a*. Further, a portion from the p-electrode 142 to the light emitting layer 145 constitutes the peripheral end part 102*c*.

The emitting part 152 is a portion from which the laser light La by the laser diode 102 is emitted. As shown in FIG. 5, the shortest distance between the emitting part 152 and the placing part 102*a* is an emitting height h152. The emitting height h152 varies depending on the laser diode 102 and therefore has a certain range. The range of the emitting height h152 (referred also to as an emitting height range w152) is, for example, about 6 μm to about 8 μm. Further, a height h102 (a distance between the surface of the n-electrode 141 and the surface of the p-electrode 142) of the laser diode 102 is about 50 μm.

Structures of Magnetic Head Part

Figure 7:
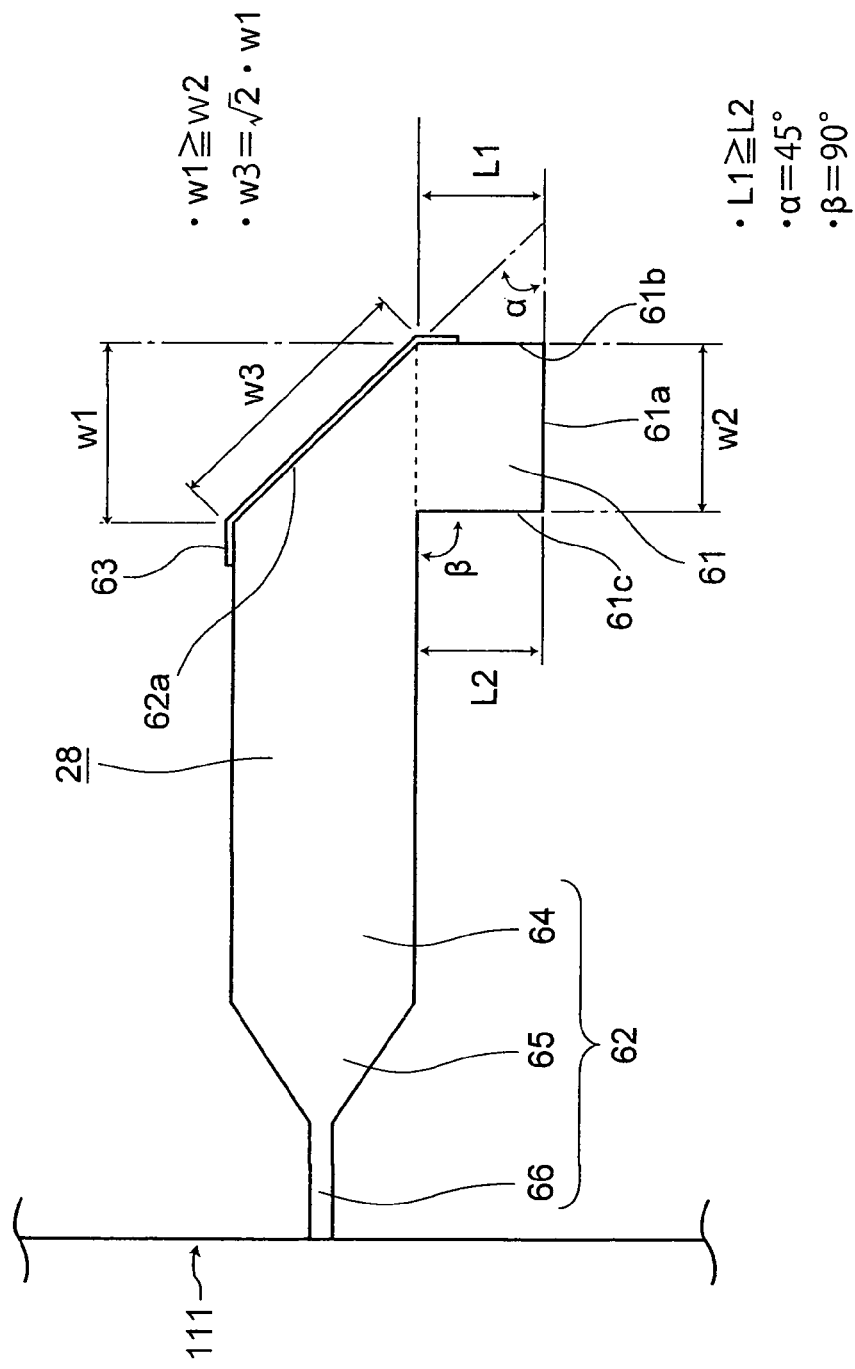
FIG. 7 is a plan view illustrating the optical wave guide.

Subsequently, the structure of the magnetic head part 260 will be described with reference to FIG. 6 to FIG. 11 in addition to FIG. 1 to FIG. 5. Here, (A) of FIG. 6 is a sectional view taken along the line 6-6 in FIG. 5, (B) of FIG. 6 is a plan view of a mirror part 63 formed in the optical wave guide 28. FIG. 7 is a plan view illustrating the optical wave guide 28. FIG. 8 to FIG. 11 are a plan view illustrating an essential part of another optical waveguide. The following will explain structures of main parts of the magnetic head part 260, while structures of parts other than the main parts will later be explained in manufacturing processes.

The magnetic head part 260 comprises a reproducing head 251 and a recording head 252, as illustrated in FIG. 3. The magnetic head part 260 has a structure in which the reproducing head 251 and the recording head 252 are laminated.

The reproducing head 251 has an MR device 5, arranged near the ABS 111, for detecting a magnetic signal. The reproducing head 251 comprises a lower shield layer 3, a lower shield gap film 4, an upper shield gap film 6 and an upper shield layer 7. These respective layers are head constituting layer that is a component of the reproducing head 251.

An insulating layer 2 is further formed on the head area 101A on the light source placing surface 115. The lower shield layer 3 made of a magnetic material is formed on the insulating layer 2. Besides, the lower shield gap film 4 as an insulating film is further formed on the lower shield layer 3, and the upper shield gap film 6 shielding the MR device 5 is formed on the lower shield gap film 4. Besides, the upper shield layer 7 made of a magnetic material is formed on the upper shield gap film 6, and an insulating layer 8 is formed on the upper shield layer 7.

The MR device 5 is constituted by a magnetosensitive film exhibiting a magnetoresistive effect, such as AMR (anisotropic magnetoresistive), GMR (giant magnetoresistive), and TMR (tunneling magnetoresistive) devices.

The GMR device may be of a CIP (Current In Plane) type or a CPP (Current Perpendicular to Plane) type. In the CIP type, current for detecting a magnetic signal flows in a direction almost parallel to planes of the layers constituting the GMR device. In the CPP type, current for detecting a magnetic signal flows in a direction almost perpendicular to planes of the layers constituting the GMR device.

Next, a structure of the recording head 252 will be described. The recording head 252 is used for recording of data onto recording surfaces of a later-described hard disk 202. The recording head 252 has a lower thin-film coil 10, a return magnetic pole layer 20, a base insulating layer 27, an optical waveguide 28, an interposed layer 29, a near-field light generating layer 30, a main magnetic pole layer 40, a linking magnetic pole layer 47, and an upper thin-film coil 50, and has a structure in which they are stacked on a head area 101A of the slider substrate 1. Each layer from the lower thin-film coil 10 to the upper thin-film coil 50 is a head constituting layer that is a component of the recording head 252.

The lower thin-film coil 10 has four turn parts. The lower thin-film coil 10 is connected to the upper thin-film coil 50 to form a series of coils. The lower thin-film coil 10 and the upper thin-film coil 50 are helical coil helically wound about the main magnetic pole layer 40.

The four turn parts are arranged at respective positions having different distances from the ABS 111. Among them, a turn part 10D is a part arranged at a position most distant from the ABS 111 among the four turn parts of the lower thin-film coil 10, and has a structure as a most distant conductive part. The four turn parts are insulated from each other by a photoresist 11.

The upper thin-film coil 50 has four turn parts similarly to the lower thin-film coil 10. The turn parts are insulated from each other by a photoresist 51.

When a current modulated according to data to be recorded on the magnetic recording medium flows through the lower thin-film coil 10 and the upper thin-film coil 50, the current causes the lower thin-film coil 10 and the upper thin-film coil 50 to generate a recording magnetic field.

The return magnetic pole layer 20 has a connecting magnetic pole layer 21, a front magnetic pole layer 22, and a rear magnetic pole layer 23. As illustrated in FIG. 4, the connecting magnetic pole layer 21 has a magnetic pole end face 21a arranged within the ABS 111 and has a portion that is more distant from the ABS 111 than is the magnetic pole end face 21a being embedded in the insulating layer 8. The connecting magnetic pole layer 21 has a size reaching a position more distant from the ABS 111 than is the turn part 10D. To the connecting magnetic pole layer 21, the front magnetic pole layer 22 is junctioned on the side closer to the ABS 111 than is the lower thin-film coil 10, and the rear magnetic pole layer 23 is junctioned at a position more distant from the ABS 111 than is the turn part 10D.

The front magnetic pole layer 22 has an end face arranged within the ABS 111. The rear magnetic pole layer 23 is arranged at a position more distant from the ABS 111 than is the turn part 10D, and is junctioned to the connecting magnetic pole layer 21 and the later-described linking magnetic pole layer 47.

The return magnetic pole layer 20 is provided to return a magnetic flux to the main magnetic pole layer 40. When a magnetic flux generated by the recording magnetic field is emitted from a later-described magnetic pole end face 41a of the main magnetic pole layer 40 to the magnetic recording medium, the magnetic flux flows back to the return magnetic pole layer 20 via the magnetic recording medium (a not-depicted soft magnetic layer in detail). This magnetic flux passes through the linking magnetic pole layer 47 and reaches the main magnetic pole layer 40.

The base insulating layer 27 is an insulating layer forming a base material that receives the optical waveguide 28. A portion of the surface of the base insulating layer 27 is exposed at the ABS 111. The base insulating layer 27 covers a surface 22a (not shown in FIG. 3, see FIG. 16) of the front magnetic pole layer 22 and the surface of an interlayer insulating layer 26. The base insulating layer 27 is arranged between the lower thin-film coil 10 and the optical waveguide 28. On a surface 27a of the base insulating layer 27 on the optical waveguide 28 side, the optical waveguide 28 is formed.

Figure 17:
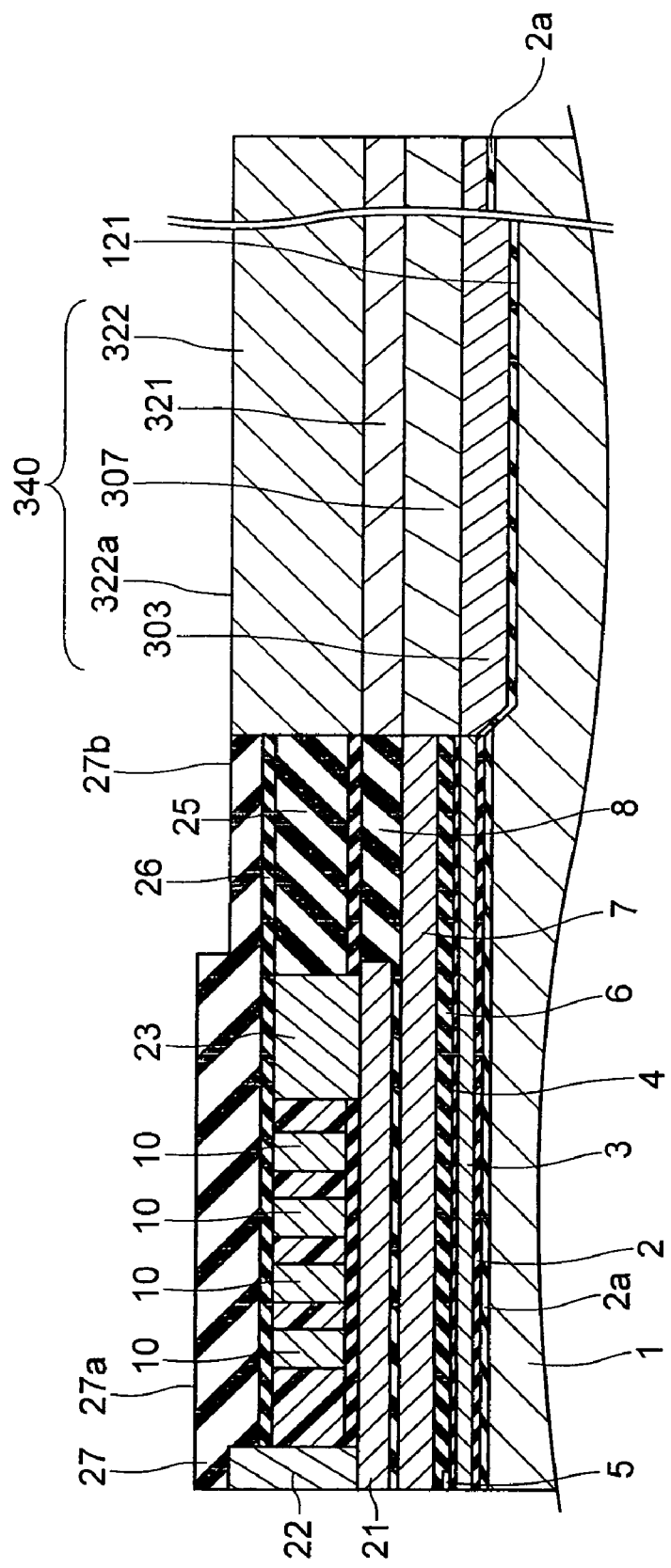
FIG. 17 is a sectional view illustrating a process subsequent to that in FIG. 16.

A stepped part 27b is further formed at a position on the surface 27a distant from the ABS 111 (see FIG. 17 for details). The stepped part 27b is a portion that is flat and has a stepped structure having a height lower than that of the surface 27a (having a shorter distance to the light source placing surface 115). Though described later for details, the thermally assisted magnetic head 100 is manufactured such that the stepped part 27b and the uppermost surface of a later-described spacer magnetic layer 340 are not misaligned with each other, that is, the surface of the stepped part 27b and the uppermost surface of the spacer magnetic layer 340 are flat without any step between them. The stepped part 27b has a function as a surface aligning part having a surface aligned with the uppermost surface of the spacer magnetic layer 340 so that there is no difference in height from the uppermost surface of the spacer magnetic layer 340.

Next, the optical waveguide part 28 will be described. The optical waveguide 28 is a member that guides the laser light La to the ABS 111 side so that the laser light La emitted from the laser diode 102 is applied to the near-field light generating layer 30. The optical waveguide 28 is formed directly on the surface 27a of the base insulating layer 27 and the stepped part 27b using a dielectric substance which transmits laser light, such as $Ta_2O_5$ or the like.

The optical waveguide 28 has a first optical waveguide 61, a second optical waveguide 62, and the mirror part 63, and is formed in a substantially L-shape that is composed of them in one united body.

The first optical waveguide 61 is connected to the wall part 122 of the light source mounting part 120 as shown in FIG. 1. The first optical waveguide 61 is a portion linearly extending from the wall part 122 along a direction along the ABS 111, and has the incident part 61a, an outer surface 61b, and an inner surface 61c as shown in FIG. 5. The first optical waveguide 61 is connected to the wall part 122, whereby the end face of the first optical waveguide 61 appears at the wall part 122. This end face is the incident part 61a. The thickness of the first optical waveguide 61 coincides with the later-described thickness h61 (1 µm to 1.5 µm), and is larger than a thickness h62 (0.3 µm to 0.5 µm) of the second optical waveguide 62 on the ABS 111 side (h61>h62).

The incident part 61a is a portion on which the laser light La is incident from the laser diode 102. The incident part 61a is formed in a rectangular shape having the lateral width (see FIG. 7) w2 in the direction intersecting with the ABS 111 and the thickness h61, and is arranged in the wall part 122 of the light source mounting part 120. The outer surface 61b continues to the incident part 61a and is formed in the direction along the ABS 111 from the incident part 61a. The outer surface 61b is arranged at a position more distant from the ABS 111 than is the inner surface 61c. The outer surface 61b has a length L1 (referred also to as an outer length, see FIG. 7) in the direction along the ABS 111.

The inner surface 61c also continues to the incident part 61a, and is formed in the direction along the ABS 111 from the incident part 61a. The inner surface 61c is arranged at a position closer to the ABS 111 than is the outer surface 61b. The inner surface 61c has a length L2 (referred also to as an inner length, see FIG. 7) in the direction along the ABS 111.

The second optical waveguide 62 is connected to the first optical waveguide 61. A portion of the optical waveguide 28 which has a portion (referred also to as a connecting part that is a portion shown by a dotted line in FIG. 7) connected to the first optical waveguide 61 and linearly extends toward the ABS 111 is the second optical waveguide 62. The second optical waveguide 62 orthogonally intersects with the ABS 111. The second optical waveguide 62 orthogonally intersects also with the first optical waveguide 61. An intersecting angle shown in FIG. 7 is 90 degrees.

The second optical waveguide 62 has a fixed width part 64, a variable width part 65, and a small width end part 66. The fixed width part 64 is a portion that linearly extends toward the ABS 111 and has a fixed width along the ABS 111. The outer portion of the fixed width part 64 distant from the optical waveguide 61 is an inclined side face 62a, and the mirror part 63 is junctioned with the inclined side face 62a from the outside.

The variable width part 65 is connected to the fixed width part 64, and arranged at a position closer to the ABS 111 than is the fixed width part 64. The variable width part 65 has a width gradually getting smaller as it approaches the ABS 111. The small width end part 66 is a portion with a small width according to a narrowest portion of the variable width part 65. The small width end part 66 is connected to the variable width part 65, and its end face is arranged within the ABS 111.

The mirror part 63 is junctioned with the inclined side face 62a of the second optical waveguide 62 from the outside. The mirror part 63 has a function of reflecting the laser light La incident through the incident part 61a and bending the travel direction of the laser light La by 90 degrees from a direction along the ABS 111 to a direction intersecting with the ABS 111.

The mirror part 63 has, as shown in FIG. 6(B), a main mirror surface 63a and two folded mirror surfaces 63b formed at both ends of the main mirror surface 63a. The main mirror surface 63a has a height corresponding to the thickness h61 and a lateral width w3.

Further, as shown in FIG. 7, the mirror part 63 is arranged in a direction forming a set angle α, seen from the incident part 61a. The set angle α is set at 45 degrees. Since the mirror part 63 is arranged in an oblique direction forming the set angle α, seen from the incident part 61a, the lateral width (this is referred also to as a projecting width) w1 of the main mirror surface 63a, seen from the incident part 61a, is smaller than the lateral width w3. The projecting width w1 is set to be equal to or larger than the lateral width w2 of the incident part 61a (w1≧w2). Further, since the set angle α is set at 45 degrees, the lateral width w3 of the main mirror surface 63a is X times the projecting width w1 (X is the square root of 2).

Figure 8:
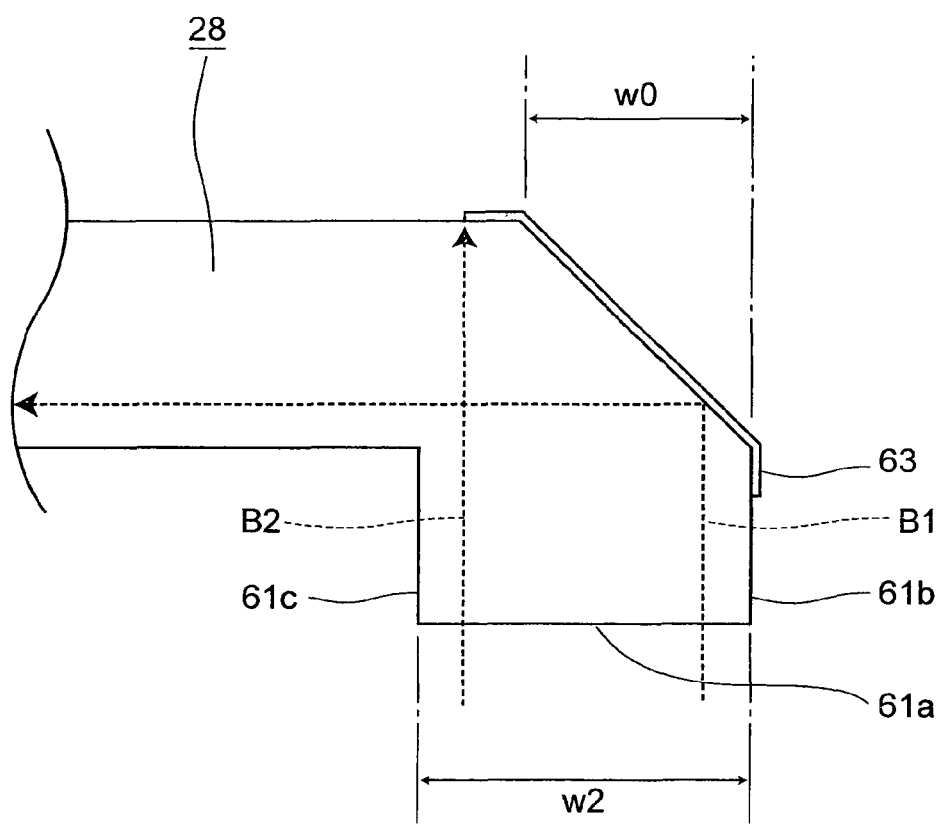
FIG. 8 is a plan view illustrating an essential part of the another optical waveguide.

Here, it is assumed that the projecting width of the mirror part 63 is set to w0 that is smaller than the lateral width w2 of the incident part 61a (w0<w2) as shown in FIG. 8. In this case, the laser light La is reflected by the mirror part 63 like a light beam B1 when the laser light La is incident on the incident part 61a on the outer surface 61b side, but the laser light La can miss the mirror part 63 and cannot be reflected by the mirror part 63 like a light beam B2 when the laser light La is incident on the incident part 61a on the inner surface 61c side.

Figure 9:
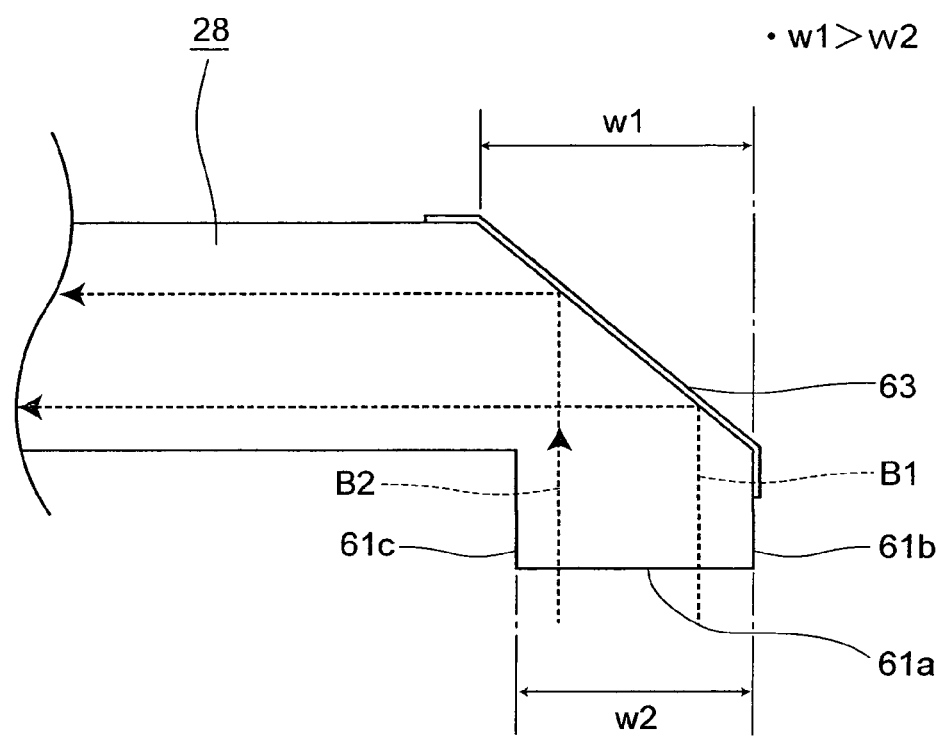
FIG. 9 is a plan view illustrating an essential part of the still another optical waveguide.

In contrast to that, when the projecting width w1 of the mirror part 63 is larger than the lateral width w2 as shown in FIG. 9, the laser light La is reflected by the mirror part 63 even if the laser light La is incident on the incident part 61a on the inner surface 61c side. In order for the laser light La to be reflected by the mirror part 63 even if the laser light La is incident on the incident part 61a on the inner surface 61c side, it is appropriate to set the projecting width w1 to be equal to or larger than the lateral width w2. In consideration of this point, the projecting width w1 of the mirror part 63 is set to have a size equal to or larger than that of the lateral width w2.

Figure 10:
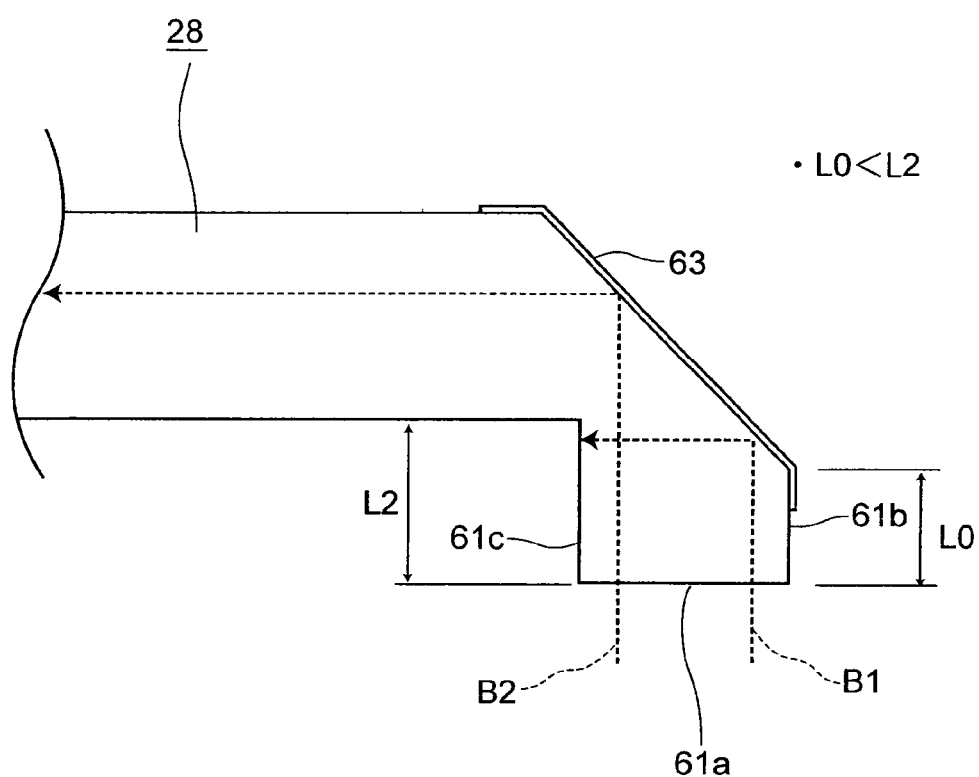
FIG. 10 is a plan view illustrating an essential part of the another optical waveguide.

Further, it is assumed that the length of the outer surface 61b is L0 that is shorter than the inner length L2. In this case, the laser light La is reflected by the mirror part 63 and then travels toward the ABS 111 like a light beam B2 when the laser light La is incident on the incident part 61a on the inner surface 61c side as shown in FIG. 10. However, when the laser light La is incident on the incident part 61a on the outer surface 61b side, the laser light La can reach the inner surface 61c and cannot travel toward the ABS 111 like a light beam B1 even if the laser light La is reflected by the mirror part 63.

Figure 11:
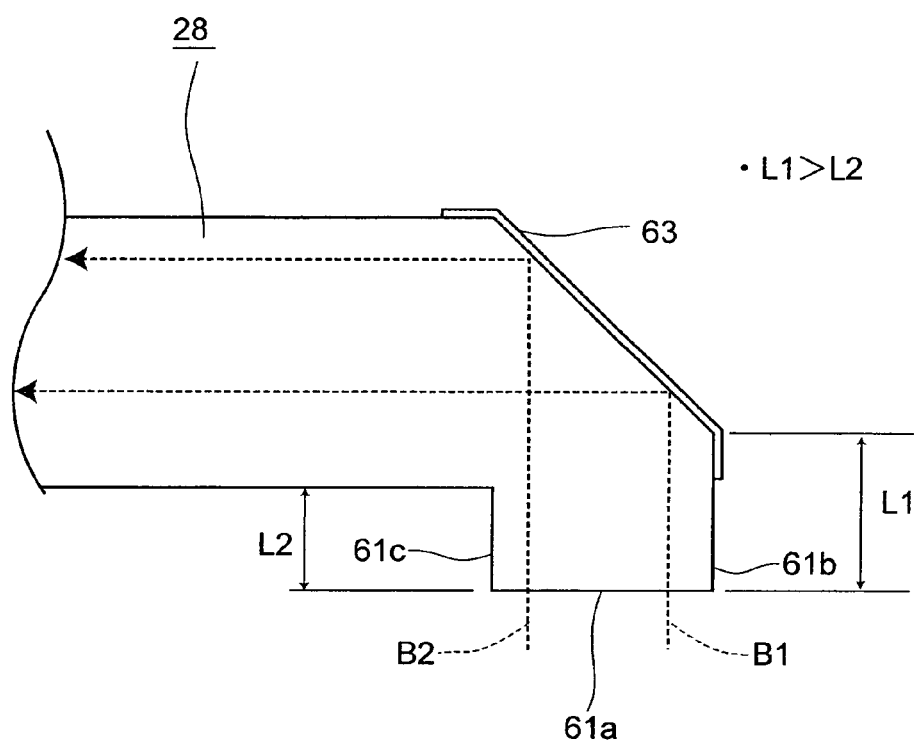
FIG. 11 is a plan view illustrating an essential part of the still another optical waveguide.

In contrast to that, when the length of the outer surface 61b is L1 that is longer than the inner length L2 as shown in FIG. 11, the laser light La is reflected by the mirror part 63 and then travels toward the ABS 111 even if the laser light La is incident on the incident part 61a on the outer surface 61b side. In order for the laser light La to be reflected by the mirror part 63 and then travel toward the ABS 111 even if the laser light La is incident on the incident part 61a on the outer surface 61b side, it is appropriate to set the outer length L1 to be equal to or larger than the inner length L2. In consideration of this point, the outer length L1 is set to have a size equal to or larger than that of the inner length L2.

Subsequently, the interposed layer 29 and the near-field light generating layer 30 will be described with reference to FIG. 3, FIG. 4. The interposed layer 29 is formed directly on the surface of the optical waveguide 28. The interposed layer 29 electrically separates the optical waveguide 28 from the near-field light generating layer 30 and the main magnetic pole layer 40. The interposed layer 29 is formed using a dielectric substance having a lower refractive index than that of the optical waveguide 28, and for example, using alumina. The interposed layer 29 has a thickness of, for example, about 10 nm to about 70 nm, which is much smaller than those of the main magnetic pole layer 40 and the optical waveguide 28, and is thus referred also to as a very-thin interposed layer.

The near-field light generating layer 30 is made of metal and formed of, for example, one of Au, Ag, Al, Cu, Pd, Pt, Rh, Ir or an alloy made of a plurality of those elements.

The near-field light generating layer 30 has a near-field light generating part 30a and a ridge part 30h. The near-field light generating layer 30 is formed in a triangle pole shape extending in a direction orthogonal to the ABS 111 (depth direction) to become distant from the ABS 111.

The near-field light generating part 30a is arranged within the ABS 111. The near-field light generating part 30a is formed in the shape of an isosceles triangle with the generating end part 30c of a side of a magnetic pole end part layer 41 being one vertex. The isosceles triangle is formed such that the two sides connected to the generating end part 30c have equal lengths.

The ridge part 30h is linearly formed along the depth direction. The ridge part 30h opposes to the later-described magnetic pole end part layer 41 of the main magnetic pole layer 40. The near-field light generating layer 30 is structured to be bilaterally symmetrical along the ABS 111 about the ridge part 30h.

The surrounding space of the near-field light generating layer 30 is filled with a dielectric substance layer 31. The dielectric substance layer 31 is formed using a dielectric substance such as alumina or the like.

Next, the main magnetic pole layer 40 and the linking magnetic pole layer 47 will be described. The main magnetic pole layer 40 is formed on the side of the ABS 111 in a manner to be opposed to the generating end part 30c of the near-field light generating layer 30. The main magnetic pole layer 40 has the magnetic pole end part layer 41 and a yoke magnetic pole layer 42.

The magnetic pole end part layer 41 has the magnetic pole end face 41a arranged within the ABS 111. The magnetic pole end part layer 41 has a depth corresponding to the near-field light generating layer 30. The yoke magnetic pole layer 42 is junctioned to the magnetic pole end part layer 41 and the linking magnetic pole layer 47. An insulating layer 32 is arranged at an ABS 111 side of the yoke magnetic pole layer 42. The yoke magnetic pole layer 42 is arranged at a position more distant from the ABS 111 than is the insulating layer 32. The yoke magnetic pole layer 42 extends in a depth direction. The yoke magnetic pole layer 42 has a structure which both a front surface of the upper thin-film coil 50 side and a rear surface of the lower thin-film coil 10 side are flat.

The linking magnetic pole layer 47 is junctioned to the yoke magnetic pole layer 42 and the rear magnetic pole layer 23 at a position more distant from the ABS 111 than are the lower thin-film coil 10 and the upper thin-film coil 50. The linking magnetic pole layer 47 magnetically links the return magnetic pole layer 20 to the main magnetic pole layer 40, and has a role of returning, to the main magnetic pole layer 40, the magnetic flux flown back to the return magnetic pole layer 20.

Operation Contents of Thermally Assisted Magnetic Head

Subsequently, the magnetic recording operation of the thermally assisted magnetic head having the above structure will be described as follows.

When a current modulated according to data to be recorded on the magnetic recording medium is caused to flow through the lower thin-film coil 10 and the upper thin-film coil 50, the lower thin-film coil 10 and the upper thin-film coil 50 generate a recording magnetic field by the current. The recording magnetic field passes through the main magnetic pole layer 40, and a magnetic flux caused by the recording magnetic field is emitted from the magnetic pole end face 41$a$ to the magnetic recording medium. With this magnetic flux, the data is recorded on the magnetic recording medium.

On the other hand, the laser diode 102 emits the laser light La from the emitting part 152. Then, the laser light La travels in the direction along the ABS 111 and then reaches the optical waveguide 28. The laser light La is then applied, as shown in FIG. 5, to the incident part 61$a$ from the direction orthogonal to the incident part 61$a$, then passes through the incident part 61$a$, and enters the optical waveguide 28. The laser light La travels in the direction along the ABS 111 in the first optical waveguide 61 and then reaches the mirror part 63.

Because the optical waveguide 28 has the mirror part 63 having the set angle α set at 45 degrees, the incident angle of the laser light La with respect to the mirror part 63 is 45 degrees and the reflection angle of the laser light La by the mirror part 63 is also 45 degrees. For this reason, the laser light La is reflected by the mirror part 63 so that the travel direction thereof is bended by 90 degrees and thereby changed to the direction intersecting with the ABS 111, and travels toward the ABS 111 in the second optical waveguide 62.

Since the near-field light generating layer 30 is arranged on the ABS 111 side of the optical waveguide 28 via the interposed layer 29, the laser light moved through the optical waveguide 28 to close to the ABS 111 are applied to the near-field light generating layer 30 via the interposed layer 29.

As described above, in thermally assisted magnetic head 100, the optical waveguide 28 has the mirror part 63 having the set angle α set at 45 degrees, and therefore even if the laser diode 102 emits the laser light La in the direction along the ABS 111, the travel direction of the laser light La is bended by 90 degrees so that the laser light La is applied to the near-field light generating layer 30.

Here, it is preferable to mount the laser diode 102 having a certain size in order to bring the output of the laser light La to a certain magnitude. Then, the laser diode 102 may have a relatively large dimension with respect to the slider 101. In this case, when the laser diode 102 is mounted on the slider 101, the proportion of the mounting space of the laser diode 102 in the light source placing surface 115 may be large.

When the size of the laser diode 102 is small, or when the size of the slider 101 is large and therefore the proportion of the mounting space is small, it is possible to mount the laser diode 102 such that the emitting part 152 thereof is arranged to oppose to the ABS 111 (such an arrangement of the laser diode 102 is referred to as an "opposing arrangement"). However, depending on the sizes of the laser diode 102 and the slider 101, it becomes possible in some case to mount the laser diode 102 only when the emitting part 152 is arranged to intersect with the ABS 111 as in the thermally assisted magnetic head 100 (such an arrangement of the laser diode 102 is referred to as an "intersecting arrangement").

The thermally assisted magnetic head 100 has the above-described optical waveguide 28, so that even if the laser diode 102 is mounted on the slider 101 in the intersecting arrangement, the laser light La is guided to the ABS 111 side and applied to the near-field light generating layer 30. This results from that the optical waveguide 28 has the mirror part 63. In other words, this results from that the mirror part 63 bends the travel direction of the laser light La by 90 degrees to change the travel direction from the direction along the ABS 111 to the direction intersecting with the ABS 111.

Further, the interposed layer 29 having a lower refractive index than that of optical waveguide 28 is in contact with the optical waveguide 28. Therefore, when laser light enter the interposed layer 29 from the optical waveguide 28 and are totally reflected, evanescent light seeps near the surface of the interposed layer 29 having a lower refractive index. The use of the evanescent light makes it possible to match the phase speed thereof with the phase speed of surface plasmons and excite surface plasmons at the near-field light generating layer 30.

The surface plasmons propagate to the generating end part 30$c$ arranged on the ABS 111 side of the near-field light generating layer 30, and the surface plasmons are concentrated on the generating end part 30$c$ because the generating end part 30$c$ is the vertex interposed between equal sides of the near-field light generating part 30$a$ in the isosceles triangle. Then, a near-field light having a very high electric field intensity is generated near the generating end part 30$c$.

The near-field light is applied from the generating end part 30$c$ to the magnetic recording medium and reaches the surface of the magnetic recording medium. Then, a limited extremely small region in the magnetic recording layer of the magnetic recording medium is intensively heated by the near-field light. In the magnetic recording layer, the coercive force reduces to an extent at which data is able to be recorded by the magnetic flux caused by the recording magnetic field.

In the thermally assisted magnetic head 100, the coercive force is able to be reduced in the above-descried manner, so that data is able to be recorded also on a magnetic recording medium having a high coercive force for high-density recording.

Incidentally, the light source placing surface 115 of the thermally assisted magnetic head 100 orthogonally intersects with the ABS 111. Because the laser diode 102 is mounted on the light source placing surface 115, the laser diode 102 bulges out in the direction along the ABS 111 in the thermally assisted magnetic head 100. Accordingly, the laser diode 102 does not bulge out in the depth direction, seen from the ABS 111, in thermally assisted magnetic head 100, so that the dimension in the depth direction is able to be set not greater than the size of the slider 101 (the slider substrate 1), resulting in that the dimension in the depth direction is able to be made smaller.

In addition, the laser diode 102 is mounted on the light source mounting part 120. The light source mounting part 120 is a portion in a recessed shape formed by the bottom part 121 and the wall part 122, and the bottom part 121 has a shape according to the outside dimension of the placing part 102$a$. Further, the wall part 122 is formed along the peripheral portion of the bottom part 121, and the incident part 61$a$ is formed at the corresponding position in the wall part 122 corresponding to the emitting part 152 of the laser diode 102.

When mounting the laser diode 102 on the light source mounting part 120, the wall part 122 exhibits a guide function of guiding the placing part 102$a$ and the peripheral end part 102$c$ to the inside of the light source mounting part 120. Therefore, it is possible to precisely and surely bring the placing part 102$a$ into contact with the surface of the bottom part 121 by fitting the placing part 102$a$ and the peripheral end part 102c into the light source mounting part 120 along the wall part 122. In addition, because the incident part 61a is formed at the corresponding position in the wall part 122 corresponding to the emitting part 152, the position of the incident part 61a precisely coincides with the position of the emitting part 152 at the point in time when the mounting of the laser diode 102 is completed, resulting in precise alignment of the incident part 61a with the emitting part 152 at a high accuracy.

Further, the precise alignment of the incident part 61a with the emitting part 152 is performed by mounting the laser diode 102 on the light source mounting part 120 in thermally assisted magnetic head 100. Accordingly, not only the accuracy of the alignment of the incident part 61a with the emitting part 152 is high but also such a precise alignment at a high accuracy is easily and simply performed in thermally assisted magnetic head 100.

Further, in the thermally assisted magnetic head 100, the wall part 122 has the end face laminated structure and the wall part 122 is formed by laminating end faces of the plurality of head constituting layers including the optical waveguide 28. In the thermally assisted magnetic head 100, the wall part 122 is formed by laminating the plurality of head constituting layers such as the optical waveguide 28, the insulating layer 25 and so on so as to form the magnetic head part 260 (described later for details). Therefore, the head forming process also includes the formation of the wall part 122, and therefore a special process for forming the wall part 122 is not required.

Accordingly, in the thermally assisted magnetic head 100, the light source mounting part 120 for mounting the laser diode 102 thereon can be easily manufactured. Further, when the spacer magnetic layer 340 is removed, the laminated end faces of the head constituting layers appear as the wall part 122, and the incident part 61a also appears. Therefore, the incident part 61a is able to be easily formed. Furthermore, it is not necessary to perform processing of the light source placing surface 115, such as formation of the recessed portion or the like in order to secure the mounting space for the laser diode 102 on the light source placing surface 115. The slider substrate 1 is made of a ceramic material and is therefore difficult to perform processing such as formation of the recessed portion or the like, but such processing is not required in this embodiment.

Further, the laser diode 102 is mounted on the slider substrate 1 made of a ceramic material in the thermally assisted magnetic head 100. Therefore, the mounting state of the laser diode 102 is stabilized, and the alignment state of the incident part 61a with the emitting part 152 is able to be stably maintained. In addition, the unity of the thermally assisted magnetic head 100 as a whole is able to be also improved, unlike the case in which the laser diode 102 is fixed to a member other than the slider 101.

The slider substrate 1 is made of ceramic material such as aluminum oxide-titanium carbide ($Al_2O_3.TiC$) or the like. Then, the slider substrate 1 has a heat sink function. Therefore, the slider substrate 1 is able to radiate heat which is generated by the laser diode 102 to the outside.

In addition to the above operation and effect, the thermally assisted magnetic head 100 is able to provide the following operation and effect.

As described above, the illustrated lower thin-film coil 10 and upper thin-film coil 50 are helical coil. Though not shown, the lower thin-film coil 10 and the upper thin-film coil 50 are able to be a coil wound like a flat spiral (a flat spiral coil). The depth of the lower thin-film coil 10 and the upper thin-film coil 50 from the ABS 111 is able to be reduced in the case in which the lower thin-film coil 10 and the upper thin-film coil 50 are composed of a helical coil more than in the case in which the lower thin-film coil 10 and the upper thin-film coil 50 are composed of a flat spiral coil. This depth is the distance between the ABS 111 and the turn part most distant from the ABS 111.

Especially when mounting the laser diode 102 on the slider 101 as in the thermally assisted magnetic head 100, the mounting space for the laser diode 102 needs to be secured on the light source placing surface 115. The mounting space for the laser diode 102 is able to be secured more easily when the depth of the lower thin-film coil 10 and the upper thin-film coil 50 is small because freedom of the size, the place, the arrangement and so on of the planned area 101B is increased. Thus, it becomes possible to mount on the slider 101 various kinds of laser diodes such as a laser diode having a size larger than that of the laser diode 102. Further, it also becomes possible to change the place of the light source mounting part. This makes it possible to change the shape of the optical waveguide and increase the freedom of the structure of the magnetic head part. For these reasons, it is preferable that the lower thin-film coil 10 and the upper thin-film coil 50 are composed of a helical coil.

Further, since the near-field light generating layer 30 is constituted to be able to take in the light through the two side faces into the near-field light generating layer 30, the near-field light generating layer 30 is able to efficiently take in evanescent light and efficiently generate surface plasmons.

Method of Manufacturing Thermally Assisted Magnetic Head

A method of manufacturing the thermally assisted magnetic head 100 having the structure mentioned above will now be explained with reference to FIG. 12 to FIG. 23 together with FIG. 1 to FIG. 3 mentioned above.

Here, FIG. 12 to FIG. 23 are sectional views in the processes of manufacturing the thermally assisted magnetic head 100, corresponding to FIG. 3. In the drawings, the left end face indicates a position (a planned opposing surface position) which will become the ABS 111 afterward.

A method of manufacturing the thermally assisted magnetic head 100 comprises a head forming process, a mounting part forming process and a light source mounting process. In the method of manufacturing the thermally assisted magnetic head 100, respective processes are performed in the order of the head forming process, the mounting part forming process and the light source mounting process.

Head Forming Process

In the head forming process, a forming of the magnetic head part 260 on the head area 101A mentioned above and a forming of a later-described spacer magnetic layer 340 on the planned area 101B are performed.

First, the slider substrate 1 made of a ceramic material such as aluminum oxide-titanium carbide ($Al_2O_3.TiC$) or the like is prepared. Then, the planned area 101B is secured on the light source placing surface 115 of the slider substrate 1. The planned area 101B is an area in which the laser diode 102 will be mounted afterward. The planned area 101B is reserved on the light source placing surface 115 so that the planned area 101B is not disappear due to formation of the magnetic head part 260 and the electrode pads 130 or the like.

Figure 12:
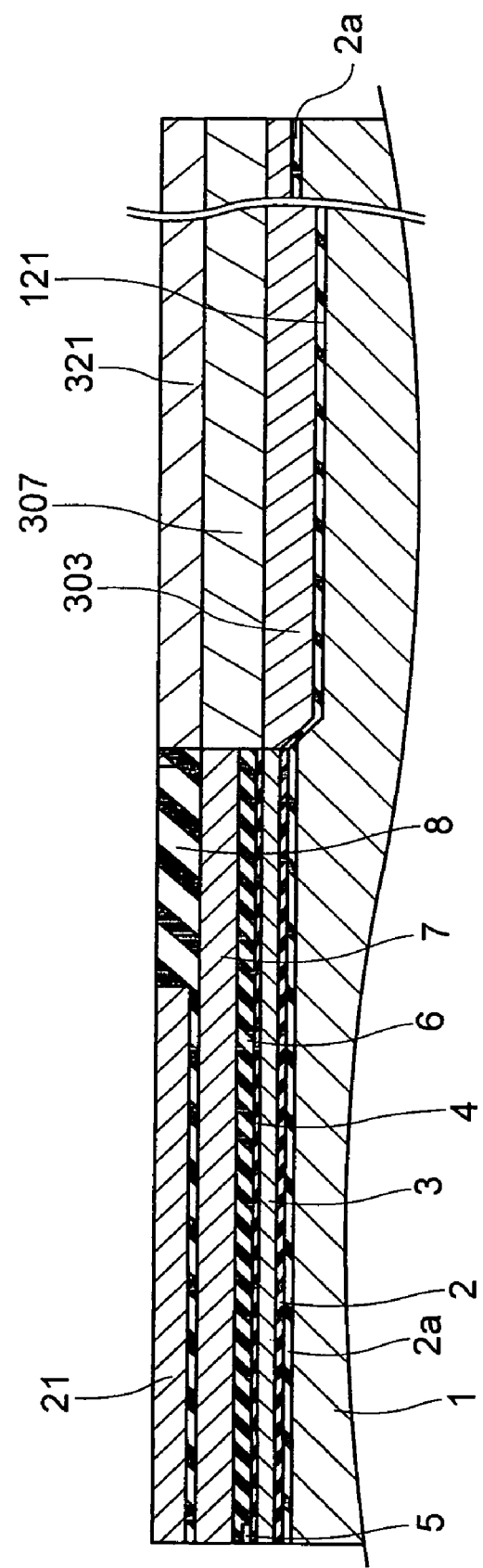
FIG. 12 is a sectional view in a process of manufacturing the thermally assisted magnetic head, corresponding to FIG. 3.

As shown in FIG. 12, a slight recess is formed in the surface in the planned area 101B in the thermally assisted magnetic head 100 in consideration of the size of the p-electrode 142 of the laser diode 102 and the emitting height h152, but the recess does not need to be formed. In this planned area 101B, the light source mounting part 120 is to be formed afterward, and the laser diode 102 is to be mounted on the light source mounting part 120. Then, an insulating film 2a having a uniform film thickness is formed on the light source placing surface 115.

Next, the insulating layer 2 made of an insulating material such as alumina ($Al_2O_3$) or the like, the lower shield layer 3 made of a magnetic material and the lower shield gap film 4 are successively formed on the head area 101A.

Subsequently, the upper shield gap film 6 is formed by an insulating material such as to shield the MR device 5. Here, an undepicted lead connected to the MR device 5 is formed, and the MR device 5 and lead are covered with the upper shield gap film 6. Thereafter, using a magnetic material, the upper shield layer 7 is formed on the upper shield gap film 6.

Then, on the upper shield layer 7, the insulating layer 8 is formed using an insulating material such as alumina ($Al_2O_3$) or the like. Thereafter, a portion of the insulating layer 8 which is located on the planned opposing surface position side is removed, and the connecting magnetic pole layer 21 is formed using a magnetic material such as CoNiFe, CoFe, NiFe, CoFeN or the like.

On the other hand, in the planned area 101B, corresponding magnetic layers 303, 307, and 321 are laminated in the order of the corresponding magnetic layers 303, 307, and 321 correspondingly to the formation of the above-described insulating layer 2 to the connecting magnetic pole layer 21.

Each of the corresponding magnetic layers 303, 307, and 321 is formed using a magnetic material for a head. The magnetic material for a head is a magnetic material used when forming each of the head constituting layers from the insulating layer 2 to the connecting magnetic pole layer 21 (the insulating layer 2, the lower shield layer 3, the lower shield gap film 4, the upper shield gap film 6, the upper shield layer 7, the insulating layer 8, and the connecting magnetic pole layer 21) in the head area 101A. The layers made of magnetic materials of the head constituting layers, that is, the lower shield layer 3, the upper shield layer 7, and the connecting magnetic pole layer 21 are the head magnetic layers. The corresponding magnetic layers 303, 307, and 321 are formed using the magnetic materials for a head used when forming the head magnetic layers respectively. For example, when the connecting magnetic pole layer 21 is formed using CoFeN that is a magnetic material, the magnetic material for a head of the connecting magnetic pole layer 21 is CoFeN, and therefore the corresponding magnetic layer 321 is formed using CoFeN.

Further, the corresponding magnetic layers 303, 307, and 321 are formed to be flush with the head magnetic layers corresponding thereto in the head area 101A such that the surfaces of the corresponding magnetic layers 303, 307, and 321 are not misaligned with the surfaces of the head magnetic layers corresponding thereto. For example, the corresponding magnetic layer 303 is formed to be flush with the lower shield layer 3. Therefore, at the point in time when the lower shield layer 3 and the corresponding magnetic layer 303 have been formed, the boundary between the head area 101A and the planned area 101B is flat without any step between them.

Then, an insulating layer 24 is formed on the head area 101A using an insulating material such as alumina ($Al_2O_3$) or the like, and a portion of the insulating layer 24 where the rear magnetic pole layer 23 will be formed is removed.

Figure 13:
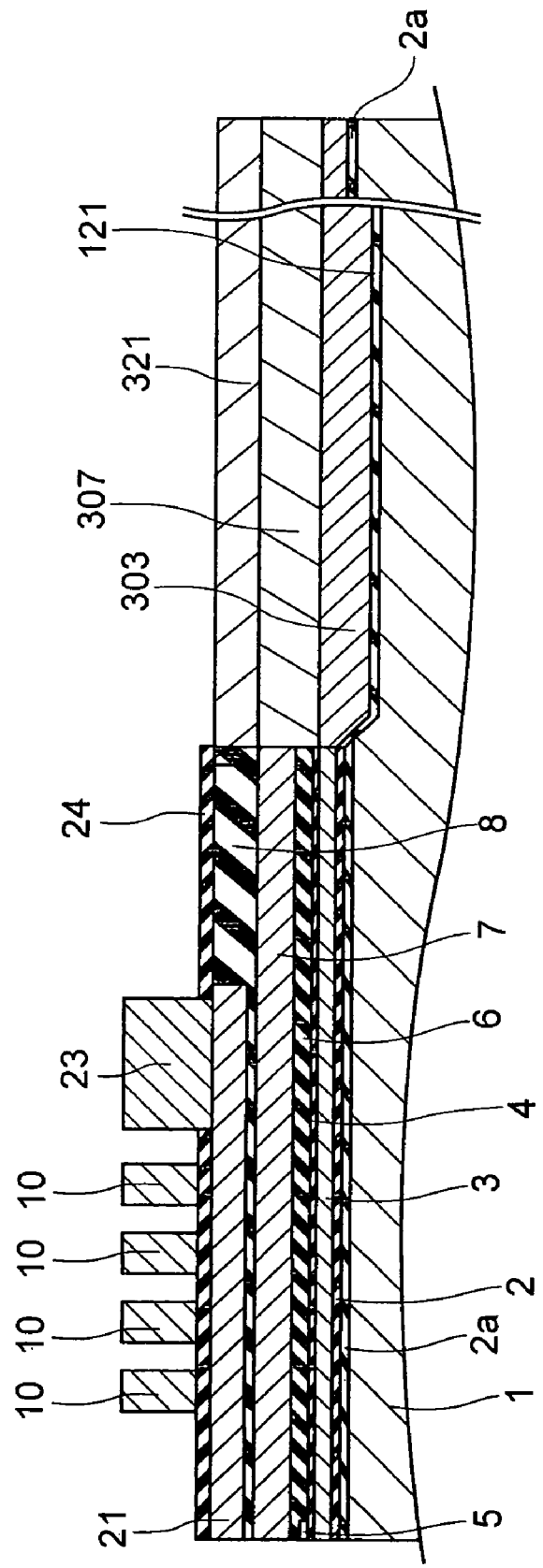
FIG. 13 is a sectional view illustrating a process subsequent to that in FIG. 12.

Then, the lower thin-film coil 10 is formed on the insulating layer 24, for example, by the frame plating method. Subsequently, the rear magnetic pole layer 23 is formed at the open portion of the insulating layer 24, for example, by the frame plating method. Through the aforementioned processes, the state illustrated in FIG. 13 is able to be yielded. Note that the order of forming the lower thin-film coil 10, the rear magnetic pole layer 23 may be changed so that the rear magnetic pole layer 23 is formed before the lower thin-film coil 10.

Figure 14:
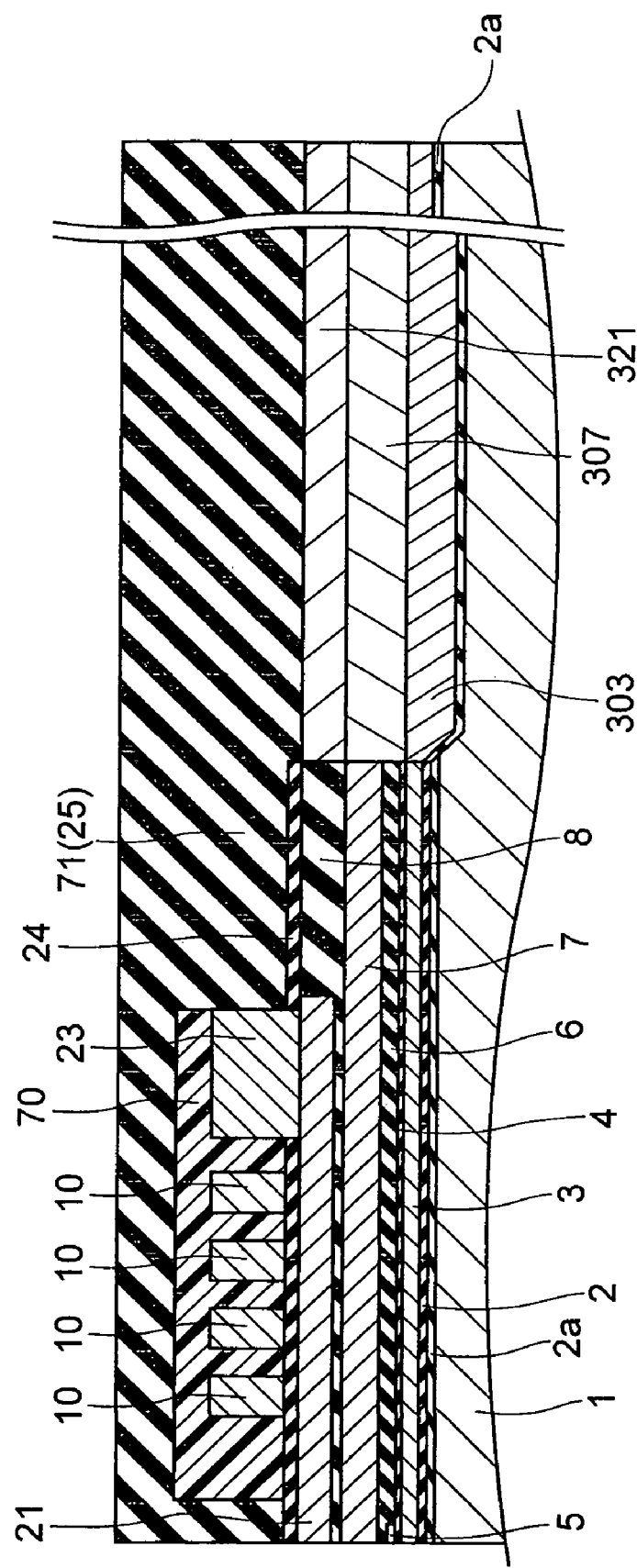
FIG. 14 is a sectional view illustrating a process subsequent to that in FIG. 13.

Next, as illustrated in FIG. 14, a photoresist is applied to the surface of the laminated body, and patterning is then performed using a predetermined photomask to form a photoresist layer 70 covering the rear magnetic pole layer 23 and the lower thin-film coil 10, on the head area 101A. Further, an insulating layer 71 which will become the insulating layer 25 is formed on the head area 101A and the planned area 101B, using an insulating material such as alumina ($Al_2O_3$) or the like.

Figure 15:
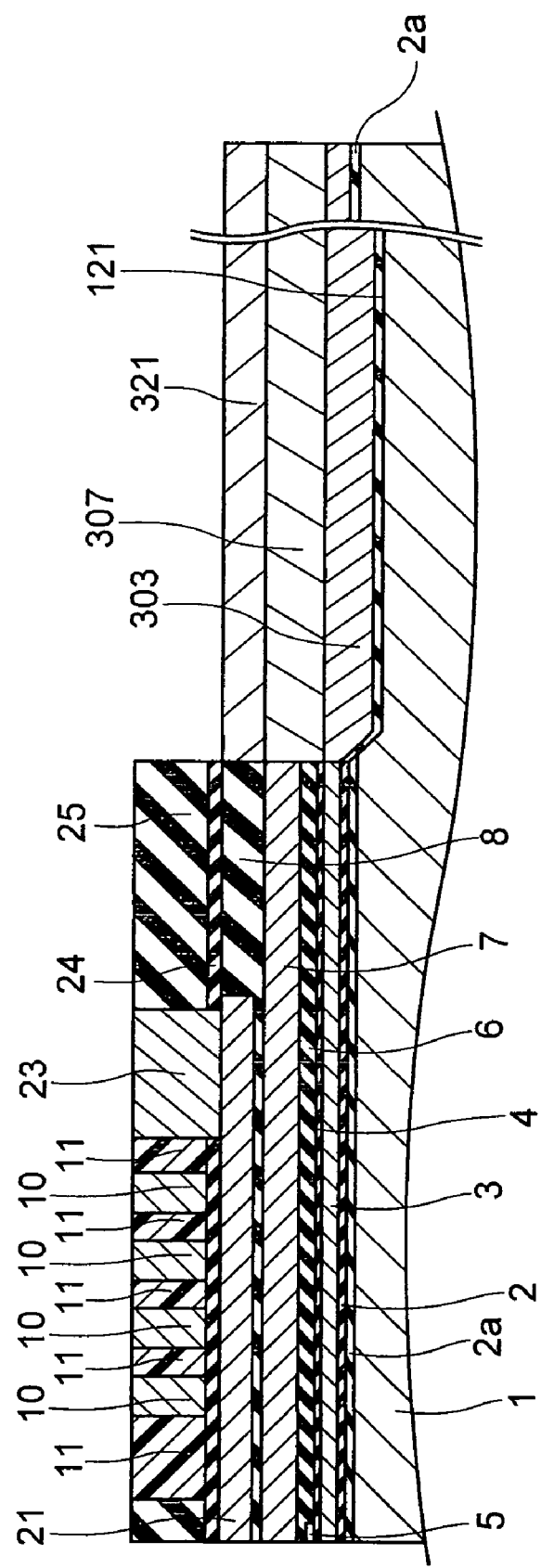
FIG. 15 is a sectional view illustrating a process subsequent to that in FIG. 14.

Thereafter, the surface of the laminated body is polished by chemical mechanical polishing (hereinafter referred to as "CMP"), for example, until the lower thin-film coil 10 emerges, so as to be made flat as shown in FIG. 15. The insulating layer 25 which is remaining on the planned area 101B is removed. This yields a state where the lower thin-film coil 10 is insulated by the photoresist 11.

Figure 16:
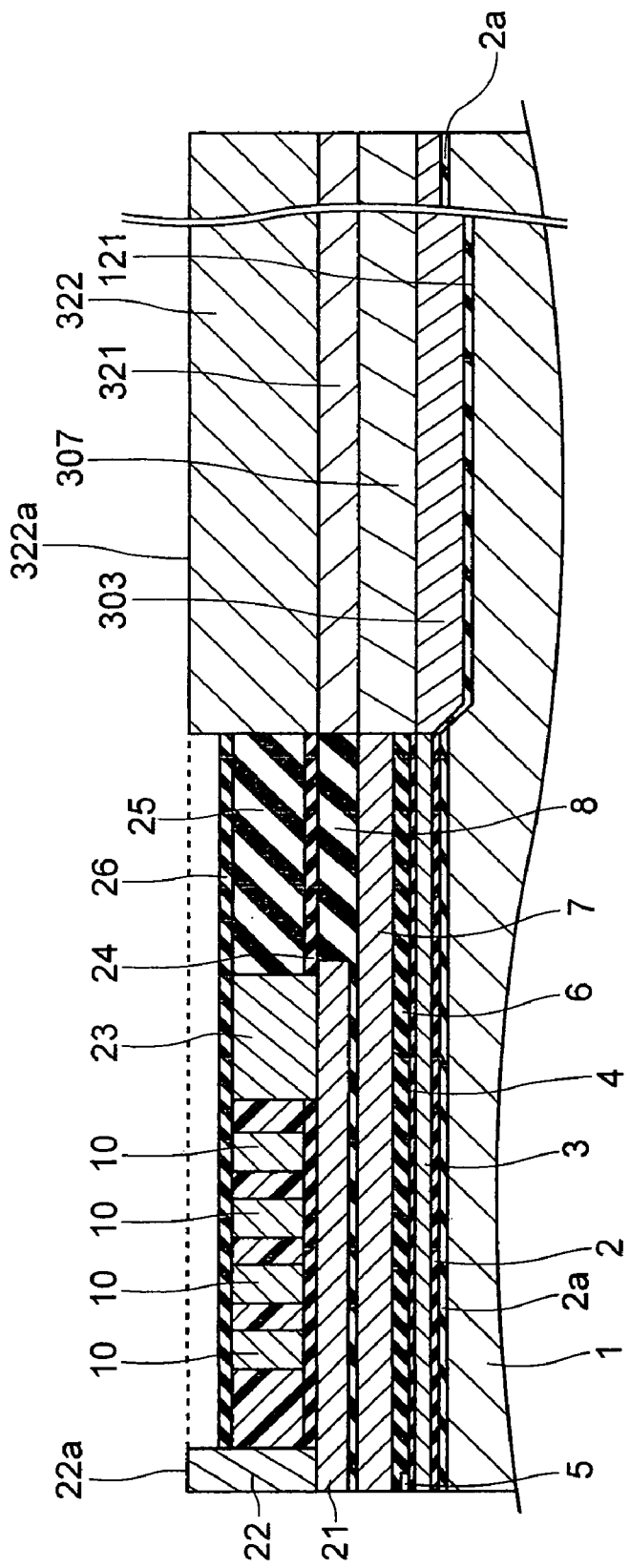
FIG. 16 is a sectional view illustrating a process subsequent to that in FIG. 15.

Subsequently, as illustrated in FIG. 16, an interlayer insulating layer 26 is formed on the whole surface of the laminated body by using an insulating material such as alumina ($Al_2O_3$) or the like so as to cover an exposing surface of the lower thin-film coil 10.

Next, in the head area 101A, a part of the interlayer insulating layer 26 which the rear magnetic pole layer 23 is formed and the front magnetic pole layer 22 will be formed are removed. In this event, the interlayer insulating layer 26 is removed from the planned area 101B, too.

Then, the front magnetic pole layer 22 is formed in the head area 101A using a magnetic material such as CoNiFe, CoFe, NiFe or the like. In this event, the front magnetic pole layer 22 is formed, whereas a corresponding magnetic layer 322 is formed in the planned area 101B using the magnetic material for a head of the front magnetic pole layer 22. The corresponding magnetic layer 322 is laminated on the corresponding magnetic layer 321. Further, the corresponding magnetic layer 322 is formed to be flush with the front magnetic pole layer 22 such that a surface 322a of the corresponding magnetic layer 322 is not misaligned with a surface 22a of the front magnetic pole layer 22.

The corresponding magnetic layer 322 is formed, whereby the spacer magnetic layer 340 is formed in the planned area 101B as shown in FIG. 17. The spacer magnetic layer 340 is formed as a spacer for securing the mounting space for the laser diode 102 on the light source placing surface 115. A portion of the spacer magnetic layer 340 arranged on the outermost side (an uppermost surface) is a surface 322a of the corresponding magnetic layer 322.

Here, at the timing when the spacer magnetic layer 340 is formed, the thickness of the spacer magnetic layer 340 is checked, and it is confirmed that this thickness falls within the above-described emitting height range w152. In this embodiment, this process is called a thickness confirming process. The thickness of the spacer magnetic layer 340 corresponds to the height from the insulating film 2a to the surface 322a in the planned area 101B and is referred also to as a spacer height 340L.

Even though the thickness confirming process is not executed, the height from the light source placing surface 115 to the optical waveguide 28 is able to be made to coincide with the emitting height h152 by forming the head constituting layers from the insulating layer 2 to the base insulating layer 27 at determined respective thicknesses. This makes it possible for the incident part 61a and the emitting part 152 to be opposed to each other. This also makes it possible for the incident part 61a and the emitting part 152 to be opposed to each other without forming the surface aligning part such as the stepped part 27b which will be described later.

However, there are some variations in the emitting height h152 of the laser diode 102, and variations may occur in the thickness of each of the head constituting layers. Therefore, the height positions of the incident part 61a and the emitting part 152 can be misaligned with each other when the laser diode 102 is mounted. Hence, the thickness confirming process is performed and the stepped part 27b is formed in this embodiment.

Further, the optical waveguide 28 is formed such that the first optical waveguide 61 is larger in thickness than the second optical waveguide 62. In this manner, the thickness h61 of the incident part 61a is made large to easily absorb the variations in the emitting height h152.

Subsequently, the base insulating layer 27 is formed on the bed area 101A using an insulating material such as alumina ($Al_2O_3$) or the like. A portion on the planned area 101B side of the surface 27a of the base insulating layer 27 is removed to form the stepped part 27b. In this event, the stepped part 27b is formed to be flush with the spacer magnetic layer 340 such that the surface of the stepped part 27b is not misaligned with the uppermost surface of the spacer magnetic layer 340 (the surface 322a of the corresponding magnetic layer 322). At the point in time when the stepped part 27b has been formed, the base insulating layer 27 and the corresponding magnetic layer 322 are flat without any step at the boundary between them.

When the stepped part 27b is formed, the uppermost surface of the laminated body laminated in the head area 101A is the surface 27a of the base insulating layer 27. The stepped part 27b is a portion that is made flush with the spacer magnetic layer 340 and is formed on the surface 27a, and therefore the stepped part 27b has a function as the surface aligning part in this embodiment. Further, the process of forming the stepped part 27b is a surface aligning part forming process.

Figure 26:
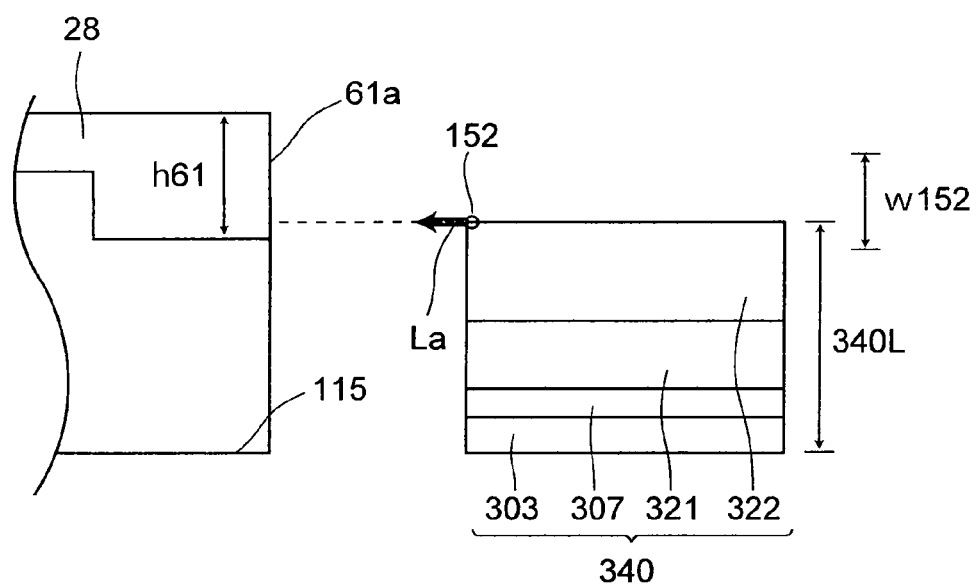
FIG. 26 is a view schematically illustrating a relation of height position of a spacer magnetic layer and the optical waveguide.

As described above, the stepped part 27b that is made flush with the spacer magnetic layer 340 is formed in the base insulating layer 27 in this embodiment. On this base insulating layer 27, the optical waveguide 28 is formed. Accordingly, if the spacer height 340L falls within the emitting height range w152, the height of a lowermost portion of the incident part 61a from the light source placing surface 115 will also fall within the emitting height range w152 as shown in FIG. 26. Thus, the emitting part 152 is opposed to the incident part 61a when the spacer magnetic layer 340 is removed and the laser diode 102 is mounted.

Then, for example, if the spacer height 340L is made to coincide with a lower limit value of the emitting height range w152 (the smallest value of the emitting height, 6 μm when the emitting height range w152 ranges from 6 μm to 8 μm), the height of the lowermost portion of the incident part 61a from the light source placing surface 115 is also to also be made to coincide with the lower limit value. Then, the smaller emitting height h152 of the laser diode 102 rather than the lower limit value of the emitting height range w152 is extremely rare, and therefore all of emitting parts 152 of laser diodes 102 to be mounted will be arranged at positions higher than the spacer height 340L. Accordingly, the emitting part 152 is able to be more surely opposed to the incident part 61a.

Therefore, it is preferable that the spacer height 340L takes a value closer to the lower limit value of the emitting height range w152, for example, falls within a range from an intermediate value to the lower limit value of the emitting height range w152 in the above-described thickness confirming process. It is more preferably to set the spacer height 340L to the lower limit value of the emitting height range w152. Since the base material receiving the optical waveguide 28 is an insulating layer that is the base insulating layer 27, the stepped part 27b is able to be easily manufactured.

Subsequently, an optical waveguide forming process is executed. In the optical waveguide forming process, the first optical waveguide 61 and the second optical waveguide 62 are formed, and the mirror part 63 is then formed. First, a dielectric substance layer is formed directly on the base insulating layer 27 on the bed area 101A using a dielectric substance which transmits laser light, such as $Ta_2O_5$ or the like. Unnecessary portions of the dielectric substance layer are removed to form the first optical waveguide 61 and the second optical waveguide 62 which constitute the optical waveguide 28. In this event, the first optical waveguide 61 and the second optical waveguide 62 are formed in such a manner that the first optical waveguide 61 is arranged on the stepped part 27b and connected to the wall part 122. The first optical waveguide 61 and the second optical waveguide 62 are formed as described above, thereby making it possible for the incident part 61a to appear at the wall part 122 when the light source mounting part 120 is formed.

Then, a member (a member for the mirror part) according to the shape of the mirror part 63 are prepared using an insulating material such as glass, resin or the like, or semiconductor material or the like, and a metal film is attached to the surface of the inside of the member to form the mirror part 63. The metal film in this case can be formed at a thickness of about 50 nm to about 200 nm, for example, using metal such as Au, Cu, Cr, Ag, Al or the like. Further, the metal film can be formed by attaching metal to the member for the mirror part, for example, by vapor deposition, sputtering or the like. The mirror part 63 thus obtained is able to be junctioned to the inclined side face 62a of the second optical waveguide 62 to form the optical waveguide 28.

Figure 18:
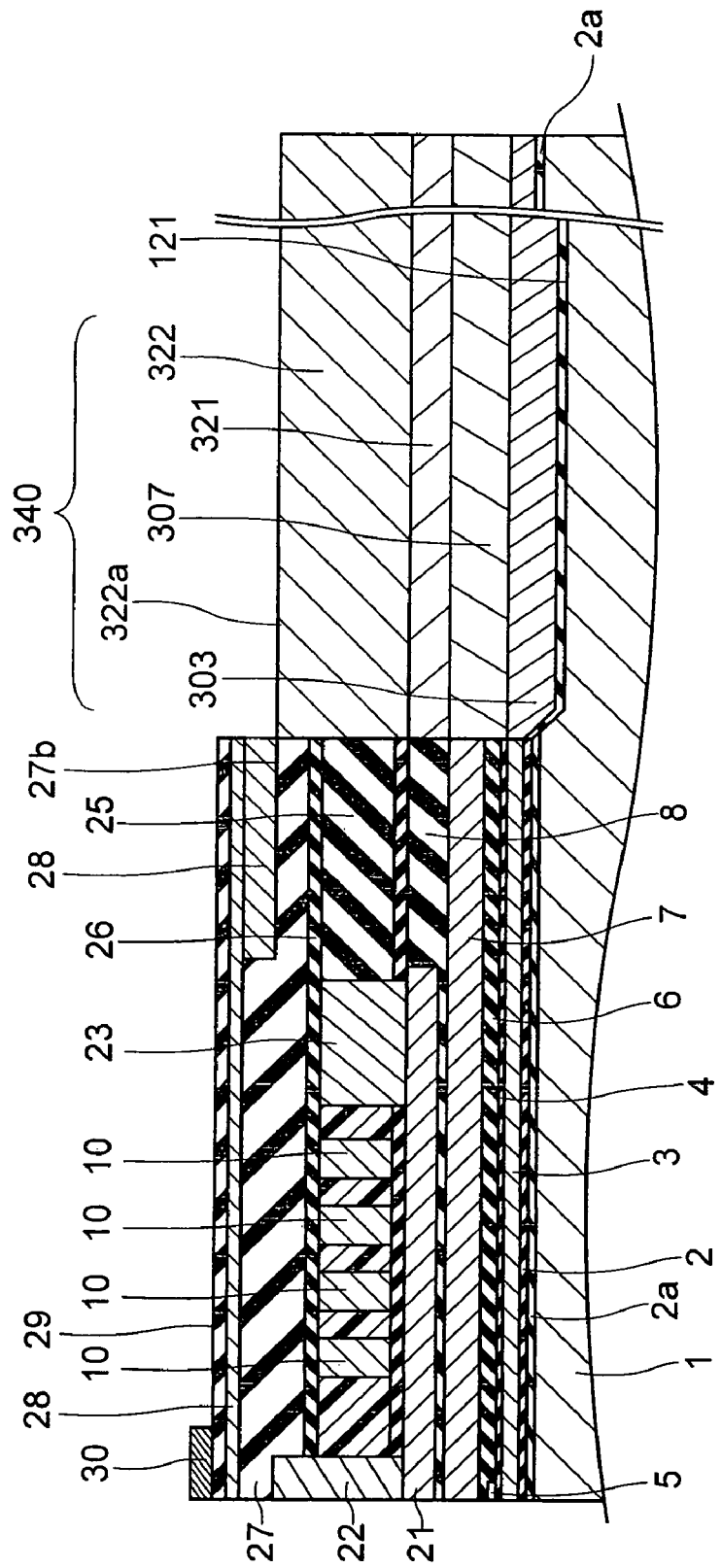
FIG. 18 is a sectional view illustrating a process subsequent to that in FIG. 17.

Next, as illustrated in FIG. 18, for example, by the atomic layer deposition, the interposed layer 29 is formed on the head area 101A using a dielectric substance such as alumina or the like. Further subsequently, a metal layer in a rod shape is formed, for example, by sputtering such that the generating end part is arranged at the planned opposing surface position and the bottom face thereof is in direct contact with the interposed 29. Then, for example, the ion beams etching or the like is used to shape the metal layer to thereby form the near-field light generating layer 30 in a triangle pole shape.

Figure 19:
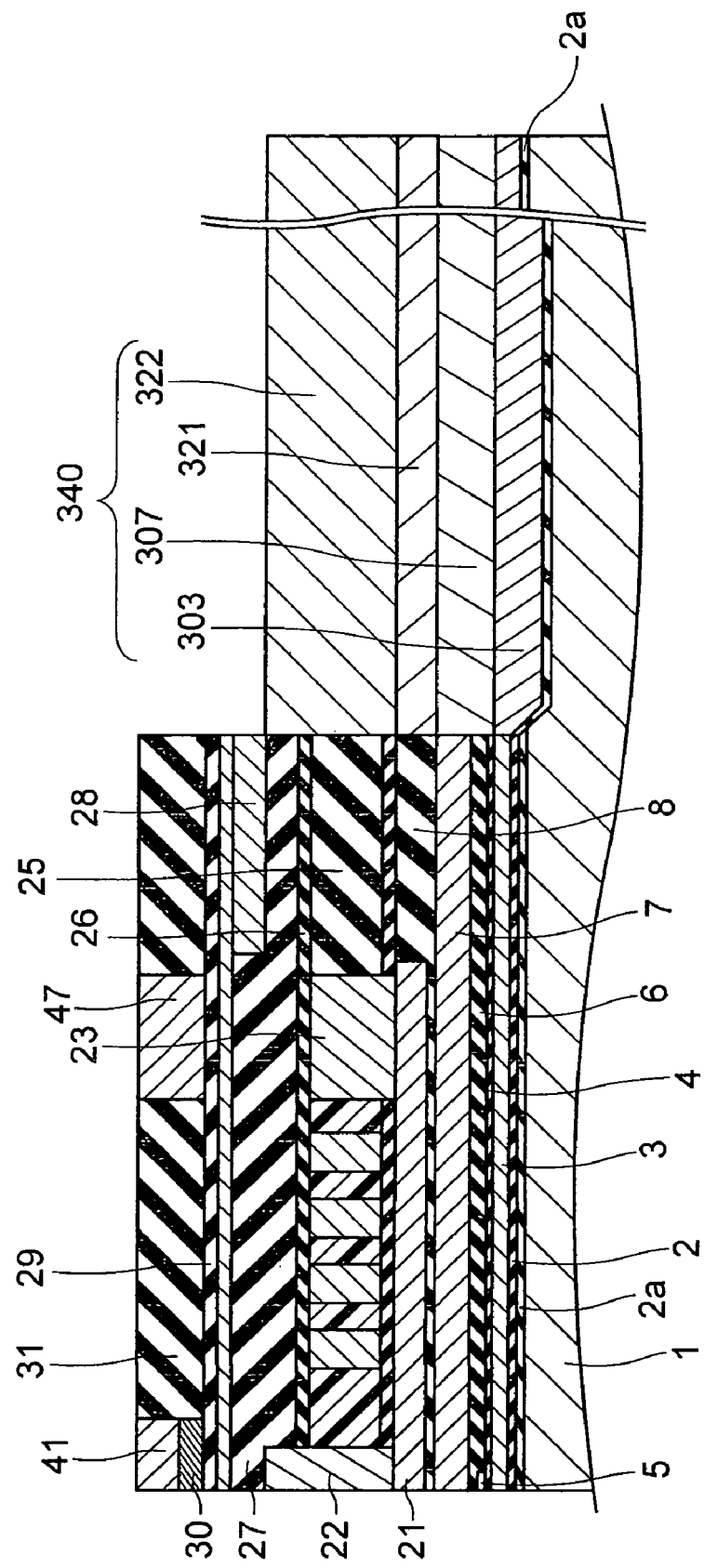
FIG. 19 is a sectional view illustrating a process subsequent to that in FIG. 18.

Further, as illustrated in FIG. 19, the dielectric substance layer 31 is formed on the head area 101A. By this, the surrounding of the near-field light generating layer 30 is filled with the dielectric substance layer 31. Besides, unnecessary portions of the dielectric substance layer 31 are removed to form the magnetic pole end part layer 41 and the linking magnetic pole layer 47.

Figure 20:
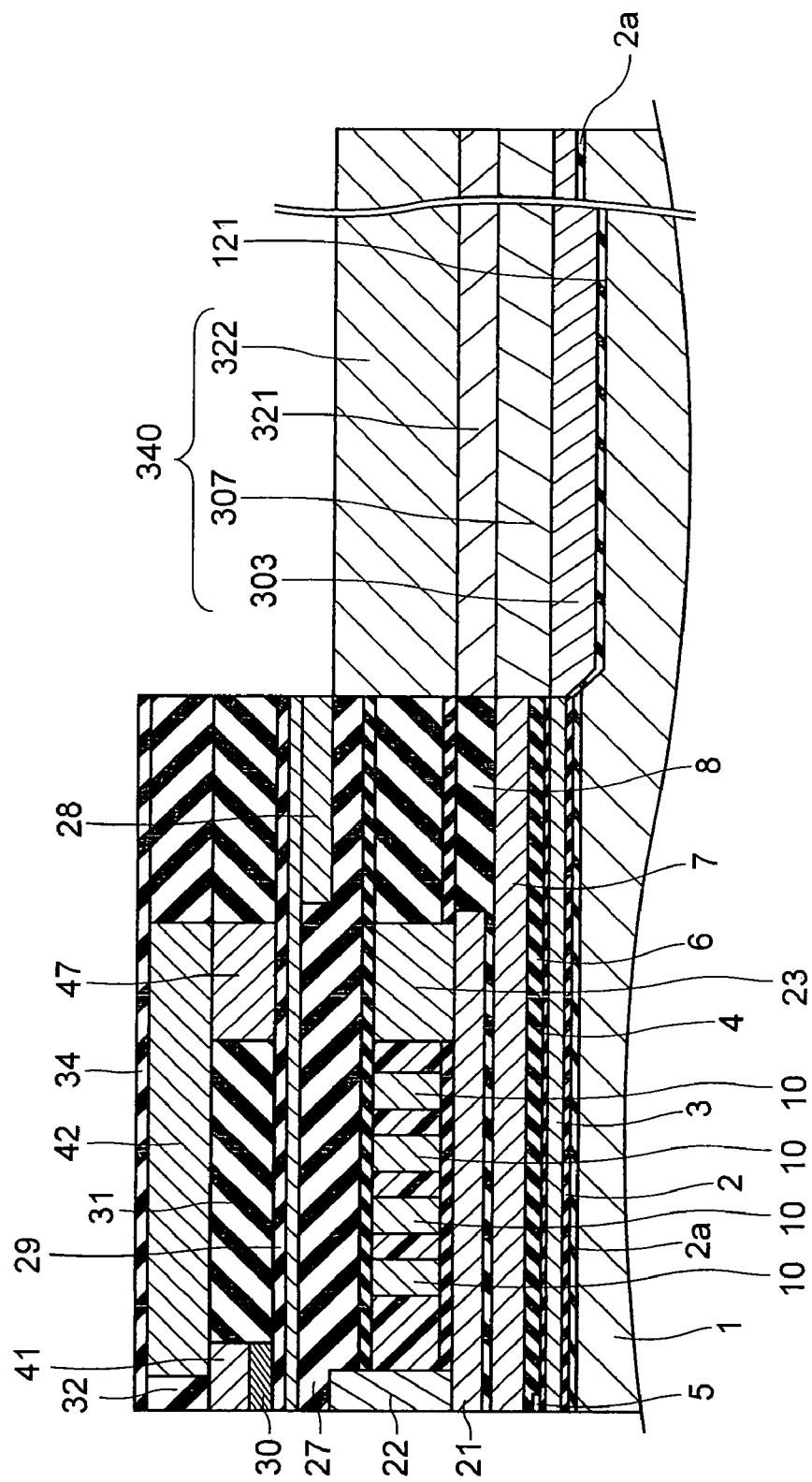
FIG. 20 is a sectional view illustrating a process subsequent to that in FIG. 19.

Subsequently, as illustrated in FIG. 20, the yoke magnetic pole layer 42 is formed on the head area 101A such that the yoke magnetic pole layer 42 is junctioned to the magnetic pole end part layer 41 and the linking magnetic pole layer 47. Thus, the main magnetic pole layer 40 is formed on the head area 101A.

Further, the insulating layer 32 is formed on the head area. 101A and the planned area 101B using an insulating material such as alumina ($Al_2O_3$) or the like, and the surface of the laminated body is polished, for example, by CMP until the yoke magnetic pole layer 42 emerges so as to make the surface of the laminated body flat. Further, the insulating layer 32 which is remaining on the planned area 101B is removed. Besides, an insulating layer 34 is formed on the head area 101A using an insulating material such as alumina ($Al_2O_3$) or the like.

Figure 21:
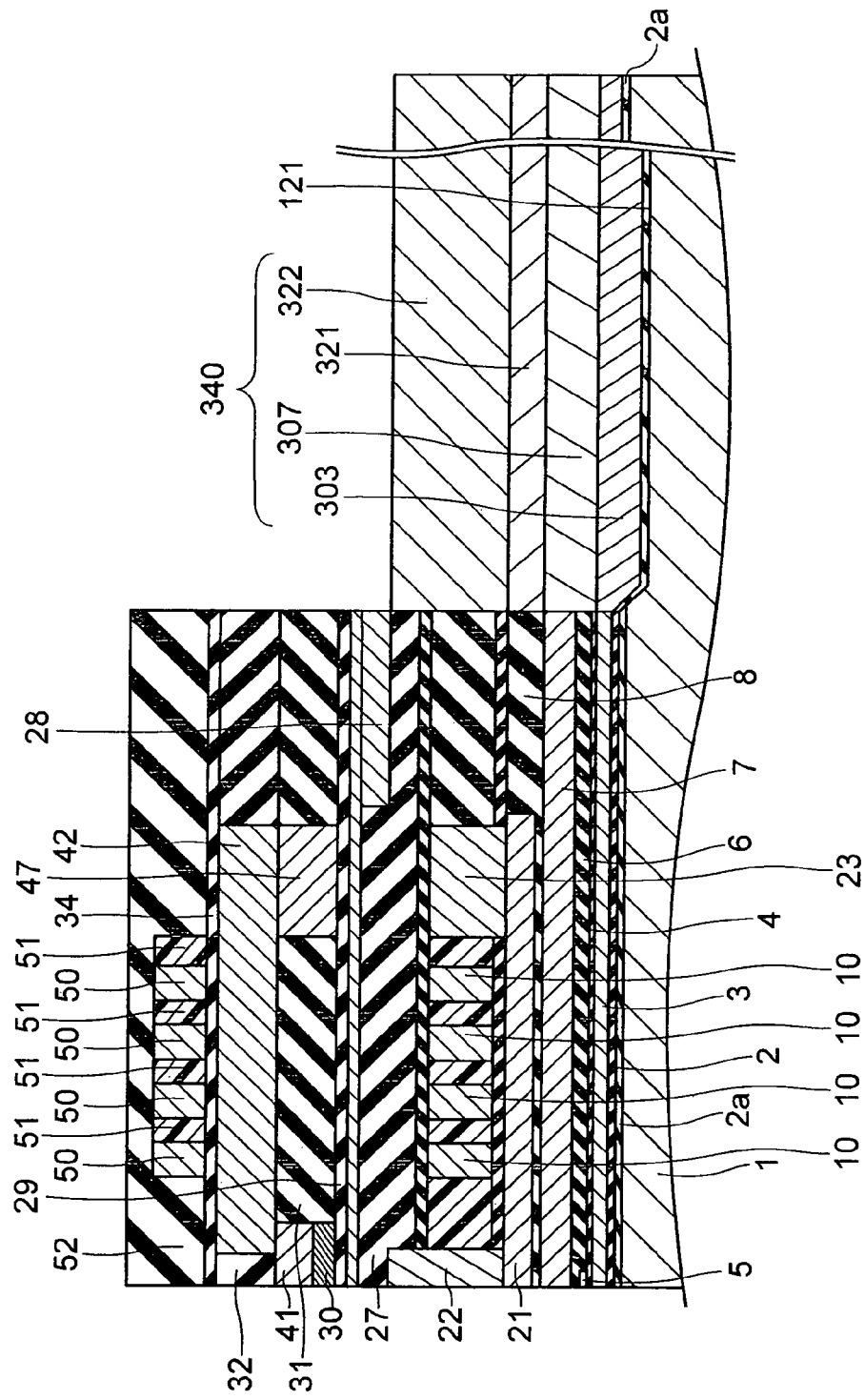
FIG. 21 is a sectional view illustrating a process subsequent to that in FIG. 20.

Then, as illustrated in FIG. 21, the upper thin-film coil 50 is formed on the insulating layer 34, for example, by the frame plating method. Then, a photoresist is applied to the surface of the laminated body, and then patterning or the like is performed using a predetermined photomask to form a photoresist layer 51. Further, an insulating layer 52 is formed on the head area 101A using an insulating material such as alumina (Al$_2$O$_3$) or the like. These processes until the insulating layer 52 is formed are head forming process. This head forming process is performed to manufacture the magnetic head part 260, as illustrated in FIG. 3, on the head area 101A.

Mounting Part Forming Process

Figure 22:
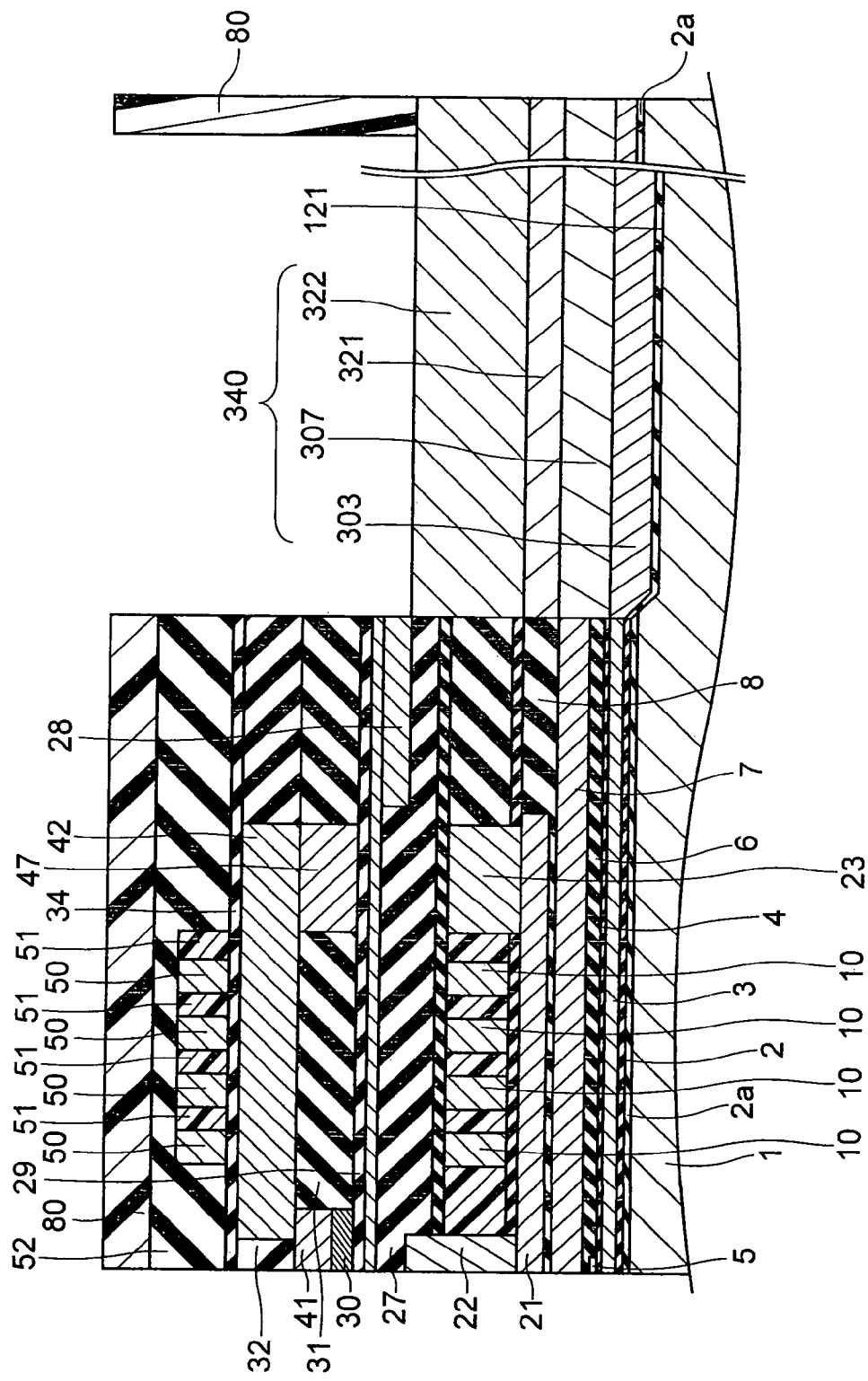
FIG. 22 is a sectional view illustrating a process subsequent to that in FIG. 21.

The mounting part forming process is performed after the head forming process. In the mounting part forming process, as illustrated in FIG. 22, a photoresist layer 80 is formed on an area except the planned area 101B. The photoresist layer 80 is formed on the head area 101A, too.

Figure 23:
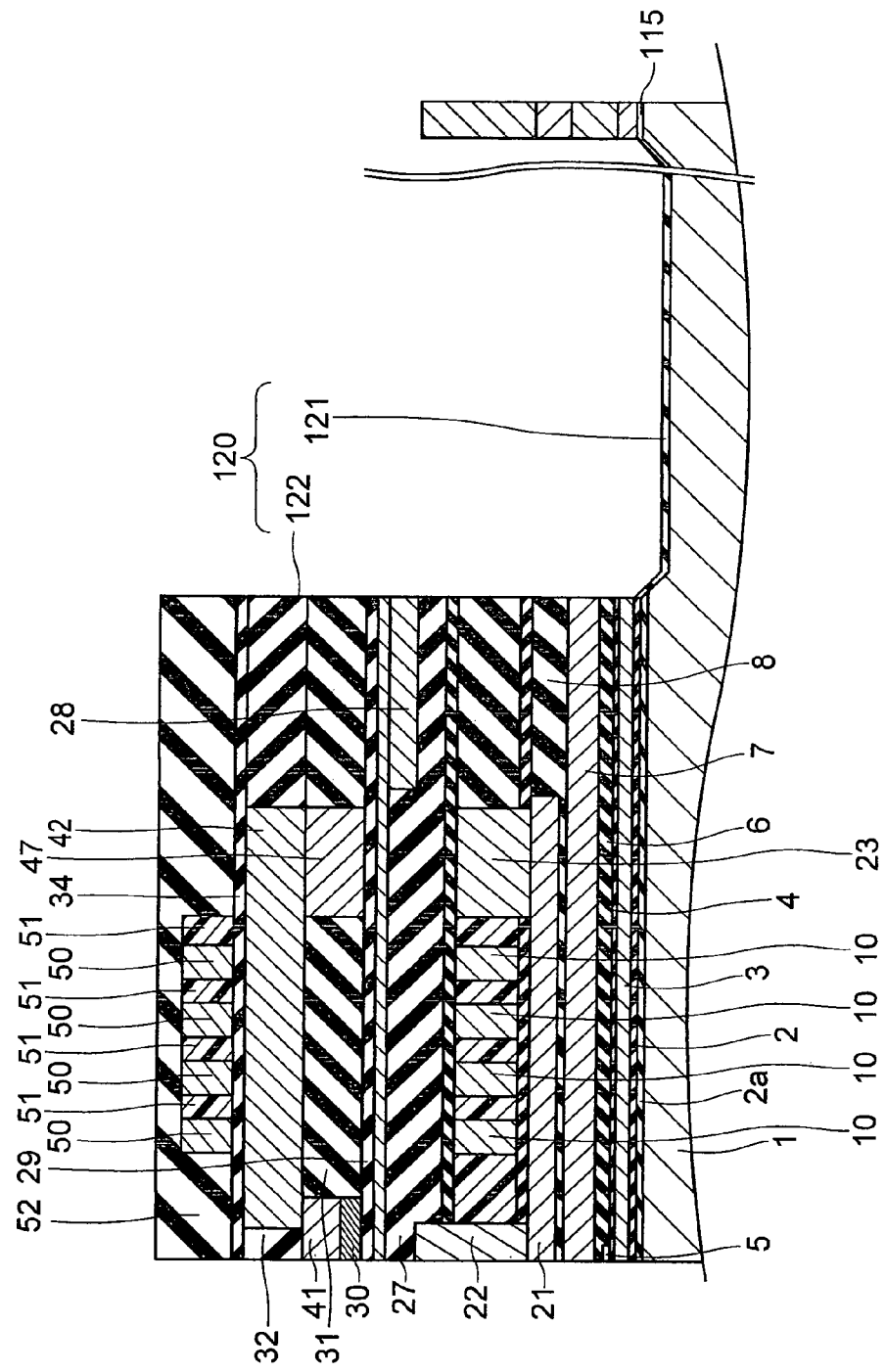
FIG. 23 is a sectional view illustrating a process subsequent to that in FIG. 22.

Then, as shown in FIG. 23, wet etching is performed on the planned area 101B using the photoresist layer 80 as a mask to remove the spacer magnetic layer 340 formed in the planned area 101B. Thereafter, the photoresist layer 80 is removed. By removing the spacer magnetic layer 340, the bottom part 121 appears in the planned area 101B and the wall part 122 in which the end faces of the head constituting layers constituting the magnetic head part 260 also appears. Further, since the first optical waveguide 61 has been connected to the wall part 122 in the optical waveguide forming process, the incident part 61a also appears at the wall part 122.

By removing the spacer magnetic layer 340, a space according to the spacer magnetic layer 340 appears in the planned area 101B. The space appearing in the planned area 101B in this event will form the light source mounting part 120, and therefore the light source mounting part 120 is able to be formed in the planned area 101B by removing the spacer magnetic layer 340. The process until the light source mounting part 120 is formed is the mounting part forming process.

Light Source Mounting Process

After the mounting part forming process, a light source mounting process is executed. In the light source mounting process, as shown in FIG. 3, the laser diode 102 is mounted on the light source mounting part 120. In this case, the laser diode 102 is mounted on the light source mounting part 120 by junctioning the placing part 102a (the p-electrode 142) of the laser diode 102 to the bottom part 121. By executing the light source mounting process, the thermally assisted magnetic head 100 is able to be manufactured.

As described above, the spacer magnetic layer 340 is formed in the planned area 101B on the light source placing surface 115 and the magnetic head part 260 is formed in the head area 101A other than the planned area 101B in the method of manufacturing the thermally assisted magnetic head 100 according to this embodiment. Therefore, the mounting space for the laser diode 102 can be surely secured on the light source placing surface 115. In addition, the spacer magnetic layer 340 is formed as the spacer for mounting the laser diode 102 thereon, and the light source mounting part 120 is formed by removing the spacer magnetic layer 340, so that the laser diode 102 is able to be mounted on the light source mounting part 120. Further, the light source mounting part 120 has the bottom part 121 and the wall part 122, so that precise alignment of the emitting part 152 with the incident part 61a at a high accuracy is able to be performed only by mounting the laser diode 102 on the light source mounting part 120, and the alignment is very easily and simply performed.

Further, since the spacer magnetic layer 340 is formed by laminating the magnetic materials for a head on the planned area 101B, the spacer magnetic layer 340 is able to also be formed at the same time by the thin film process of forming the magnetic head part 260. Accordingly, a special process only for forming the spacer magnetic layer 340 becomes unnecessary, resulting in simplified processes of manufacturing the thermally assisted magnetic head 100.

Further, since the whole of spacer magnetic layer 340 is composed of magnetic materials, the whole of spacer magnetic layer 340 is able to be removed by wet etching at a time by one process. Accordingly, the processes of manufacturing the thermally assisted magnetic head 100 is able to be further simplified. If a layer made of a material different from the magnetic materials, for example, an insulating layer or the like is included in the spacer magnetic layer 340, a process different from the wet etching may be necessary to remove the insulating layer or the like. In terms of this, there is no such possibility in the above-described method of manufacturing the thermally assisted magnetic head 100.

Further, the spacer magnetic layer 340 is formed by laminating the corresponding magnetic layers 303, 307, 321, and 322 in the planned area 101B. Since the corresponding magnetic layers 303, 307, 321, and 322 are flush with the head magnetic layers corresponding thereto respectively, the surface in the head area 101A and the surface in the planned area 101B is able to be aligned with each other at the point in time when the spacer magnetic layer 340 is completed. In the processes of manufacturing the thermally assisted magnetic head 100, after the above-described thickness confirming process is executed, the surface aligning part (the above-described stepped part 27b) that is flush with the spacer magnetic layer 340 is formed on the uppermost surface (the surface 27a of the base insulating layer 27) of the laminated body, and the optical waveguide 28 is formed directly on the surface aligning part. Accordingly, at the point in time when the thermally assisted magnetic head 100 is completed, the height position of the incident part 61a precisely coincides with the height position of the emitting part 152.

Modified Example 1

Figure 24:
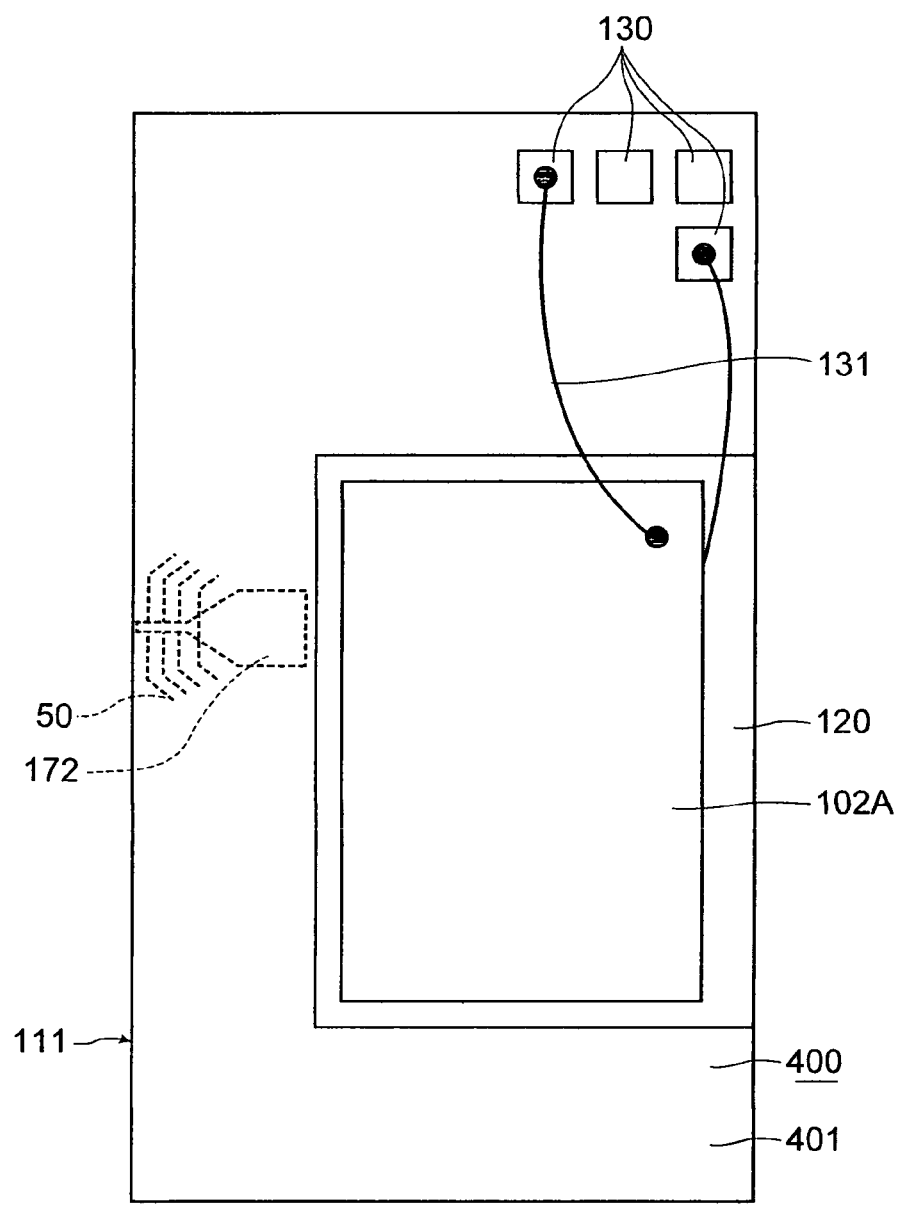
FIG. 24 is a plan view of the thermally assisted magnetic head according to a modified example, similar to FIG. 1.

FIG. 24 is a plan view of a thermally assisted magnetic head 400 according to a modified example, similar to FIG. 1. The thermally assisted magnetic head 400 is different from the thermally assisted magnetic head 100 in that the thermally assisted magnetic head 400 has a slider 401. The slider 401 is different from the slider 101 in that a laser diode 102A is mounted in the opposing arrangement, and that an optical waveguide 172 is formed. The laser diode 102A emits a laser light from the side face opposing the ABS 111. The optical waveguide 172 is linearly formed along a direction intersecting with the ABS 111. The laser light is emitted from the laser diode 102A in the direction intersecting with the ABS 111, and therefore the optical waveguide 172 has a structure in which a mirror part as that in the optical waveguide 28 is not provided. The thermally assisted magnetic head 400 has a light source mounting part 120 similar to that of the thermally assisted magnetic head 100, so that precise alignment of the incident part with the emitting part is able to be performed, and the alignment is easily performed.

Modified Example 2

Figure 25:
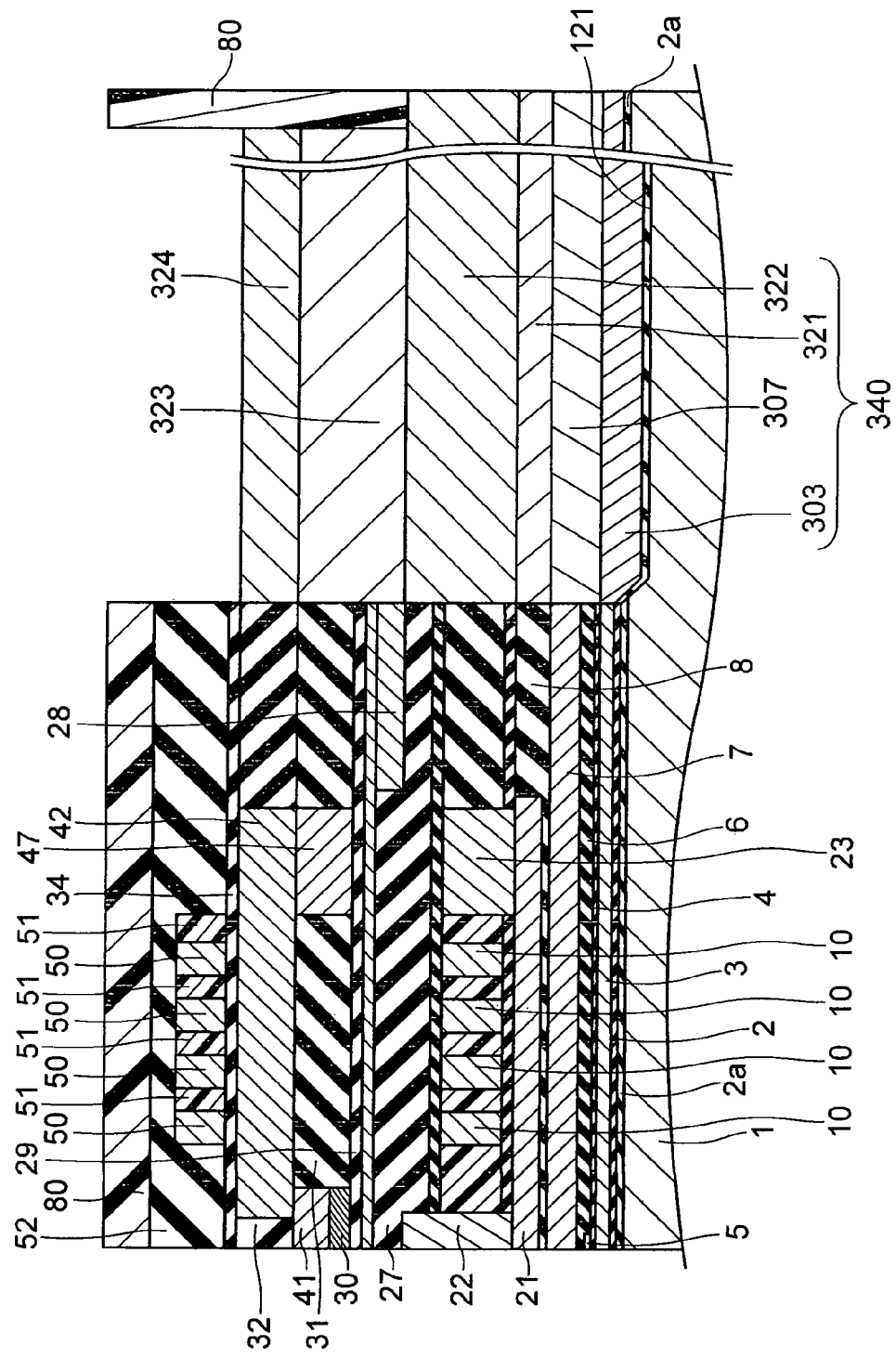
FIG. 25 is a sectional view of the thermally assisted magnetic head according to an another modified example, similar to FIG. 3.

In the above-described embodiment, the spacer magnetic layer 340 is formed by laminating the corresponding magnetic layers 303, 307, 321, and 322 in the planned area 101B. In addition to the corresponding magnetic layers 303, 307, 321, and 322, corresponding magnetic layers 323 and 324 may be laminated in the planned area 101B as shown in FIG. 25. The corresponding magnetic layers 323 and 324 are formed using the magnetic materials for a head of the magnetic pole end part layer 41 and the yoke magnetic pole layer 42 respectively such that their surfaces are aligned with each other. Even if the corresponding magnetic layers 323 and 324 are laminated, the light source mounting part 120 is able to be formed in the planned area 101B by performing wet etching.

Modified Example 3

Besides, the spacer magnetic layer 340 is formed as the spacer in the above-described embodiment. Instead of forming the spacer magnetic layer 340, a ready-made spacer (not shown) may be arranged in the planned area 101B. This spacer has the same outside dimension, emitting height and so on as those of the laser diode 102 to be mounted, and should be a so-called dummy laser diode. The spacer is arranged in the planned area 101B until the head forming process is completed, and the spacer is removed after the head forming process is completed, whereby the light source mounting part is able to be formed in the planned area 101B. Even if such a spacer is arranged, the laser diode 102 is able to be mounted on the slider 101, and alignment of the emitting part with the incident part at a high accuracy is able to be performed.

Embodiments of Head Gimbal Assembly and Hard Disk Drive

Next, embodiments of the head gimbal assembly and hard disk drive will now be explained with reference to FIG. 27, FIG. 28.

Figure 27:
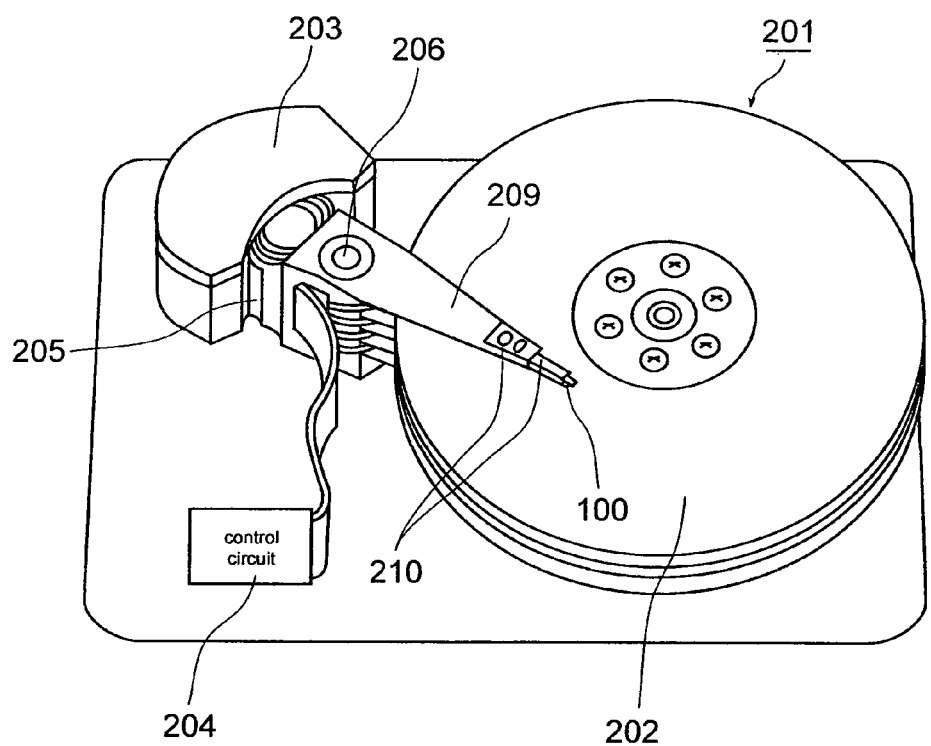
FIG. 27 is a perspective view illustrating a hard disk drive equipped with the thermally assisted magnetic head in FIG. 1.
Figure 28:
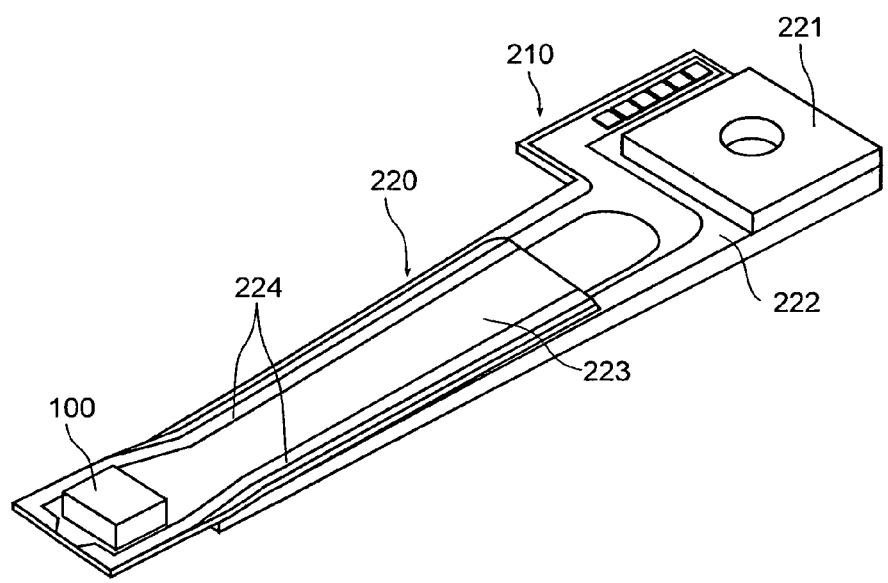
FIG. 28 is a perspective view illustrating a rear side of HGA.

FIG. 27 is a perspective view showing a hard disk drive 201 equipped with the above-mentioned thermally assisted magnetic head 100. The hard disk drive 201 includes a hard disk (magnetic recording medium) 202 rotating at a high speed and a head gimbal assembly (HGA) 210. The hard disk drive 201 is an apparatus which actuates the HGA 210, so as to record/reproduce data onto/from recording surfaces of the hard disk 202. The hard disk 202 has a plurality of (4 in the drawing) platters. Each platter has a recording surface opposing its corresponding thermally assisted magnetic head 100.

The hard disk drive 201 positions a slider 101 on a track by an assembly carriage device 203. Further, the hard disk drive 201 has a plurality of drive arms 209. The drive arms pivot about a pivot bearing shaft 206 by means of a voice coil motor (VCM) 205, and are stacked in a direction along the pivot bearing shaft 206. Further, an HGA 210 is attached to the tip of each drive arm.

Further, the hard disk drive 201 has a control circuit 204 controlling recording/reproducing and the generation of light by the laser diode 102.

The HGA 210 will now be described with reference to FIG. 28. FIG. 28 is a perspective view illustrating a rear face side of the HGA 210. In the HGA 210, the thermally assisted magnetic head 100 having the slider 101 is fixed to a tip portion of a suspension 220. Further, in the HGA 210, one end portion of a wiring member 224 is electrically connected to a terminal electrode of the slider 101.

The suspension 220 has a load beam 222, a base plate 221 provided at a base portion of the load beam 222, a flexure 223 fixed to and supported on the load beam 222 from the tip end side to the front side of the base plate 221 and having elasticity, and the wiring member 224. The wiring member 224 has a lead conductor and connection pads electrically connected to both ends of the lead conductor.

In the hard disk drive 201, when the HGA 210 is rotated, the thermally assisted magnetic head 100 moves in a radial direction of the hard disk 202, i.e., a direction traversing track lines.

The aforementioned HGA 210 and hard disk drive 201 have the thermally assisted magnetic head 100, and thus have a small size along the depth direction from the ABS 111.

What is claimed is:

1. A method of manufacturing a thermally assisted magnetic head comprising a slider having a medium-opposing surface opposing a magnetic recording medium; and a laser diode emitting a laser light, comprising:
   a head forming step of securing a planned area, according to a placing part of the laser diode to be placed on a light source placing surface of a slider substrate constituting the slider intersecting with the medium-opposing surface, which the laser diode will be mounted afterward on the light source placing surface, then forming a magnetic head part, in a head area other than the planned area on the light source placing surface, including a recording head used for recording data on the magnetic recording medium and an optical waveguide guiding the laser light emitted from the laser diode to the medium-opposing surface side, and forming or arranging a spacer for securing a mounting space for the laser diode, in the planned area;
   a mounting part forming step of removing the spacer to form, in the planned area, a light source mounting part comprising a bottom part according to the placing part and a wall part formed along an edge portion of the bottom part and having an incident part of the optical waveguide on which the laser light is incident, formed at a corresponding position corresponding to an emitting part of the laser diode from which the laser light is emitted; and
   a light source mounting step of mounting the laser diode on the light source mounting part formed by the mounting part forming step.

2. The method of manufacturing a thermally assisted magnetic head according to claim 1,
   wherein in the head forming step, a spacer magnetic layer is formed as the spacer using a magnetic material for a head used when the magnetic head part is formed.

3. The method of manufacturing a thermally assisted magnetic head according to claim 1,
   wherein in the head forming step, a spacer magnetic layer is formed as the spacer using magnetic materials for a head used when a plurality of head magnetic layers constituting the magnetic head part are formed respectively, and the spacer magnetic layer is composed of a plurality of laminated corresponding magnetic layers being flush with the respective head magnetic layers.

4. The method of manufacturing a thermally assisted magnetic head according to claim 3,
   wherein the head forming step comprises:
   a surface aligning part forming step of forming a surface aligning part that is flush with the spacer magnetic layer, on an uppermost surface of a laminated body that has been already laminated in the head area; and
   an optical waveguide forming step of forming the optical waveguide on the surface aligning part.

5. The method of manufacturing a thermally assisted magnetic head according to claim 4,
   wherein where a distance from the placing part of the laser diode to the emitting part emitting the laser light is an emitting height, and when a thickness of the spacer magnetic layer falls within an emitting height range indicating a range of the emitting height, the surface aligning part forming step is executed.

6. The method of manufacturing a thermally assisted magnetic head according to claim 5,
wherein when the thickness of the spacer magnetic layer falls within a range lower than an intermediate value of the emitting height range, the surface aligning part forming step is executed.

7. The method of manufacturing a thermally assisted magnetic head according to claim 4,
wherein in the optical waveguide forming step, the optical waveguide is formed to be connected to the wall part.

8. The method of manufacturing a thermally assisted magnetic head according to claim 4,
wherein when the emitting part emitting the laser light intersects with the medium-opposing surface when the laser diode is mounted on the light source mounting part in the light source mounting step, a mirror part changing a direction of the laser light from a direction along the medium-opposing surface to a direction intersecting with the medium-opposing surface is formed in the optical waveguide forming step.

9. The method of manufacturing a thermally assisted magnetic head according to claim 4,
wherein in the optical waveguide forming step, the optical waveguide is formed such that a thickness of a portion of the optical waveguide on a light source side closer to the planned area is larger than a thickness of a portion of the optical waveguide on an opposing surface side closer to the medium-opposing surface.

10. The method of manufacturing a thermally assisted magnetic head according to claim 1,
wherein the head forming step comprises:
a near-field light generating layer forming step of forming a near-field light generating layer generating near-field light for heating the magnetic recording medium using the laser light;
a coil forming step of forming a thin film coil constituting the recording head; and
a main magnetic pole layer forming step of forming a main magnetic pole layer constituting the recording head.

* * * * *